(12) United States Patent
Furukawa

(10) Patent No.: US 10,489,888 B2
(45) Date of Patent: Nov. 26, 2019

(54) DISPLAY CONTROL APPARATUS AND METHOD FOR CONTROLLING THE SAME BASED ON ORIENTATION

(71) Applicant: CANON KABUSHIKI KAISHA, Tokyo (JP)

(72) Inventor: Nobuyuki Furukawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 15/284,289

(22) Filed: Oct. 3, 2016

(65) Prior Publication Data
US 2017/0097692 A1    Apr. 6, 2017

(30) Foreign Application Priority Data

Oct. 5, 2015 (JP) ................................. 2015-197896
Sep. 14, 2016 (JP) ................................. 2016-179844

(51) Int. Cl.
| | |
|---|---|
| *G06T 3/60* | (2006.01) |
| *G06F 3/0487* | (2013.01) |
| *G06F 3/0488* | (2013.01) |
| *G06F 1/16* | (2006.01) |

(52) U.S. Cl.
CPC .............. *G06T 3/60* (2013.01); *G06F 1/1694* (2013.01); *G06F 3/0487* (2013.01); *G06F 3/0488* (2013.01); *G06F 2200/1637* (2013.01)

(58) Field of Classification Search
CPC ....... G06T 3/60; G06F 1/1694; G06F 3/0487; G06F 3/0488; G06F 2200/1637
See application file for complete search history.

(56) References Cited

U.S. PATENT DOCUMENTS

| | | | | |
|---|---|---|---|---|
| 5,973,664 A * | 10/1999 | Badger | .................. | G09G 5/393 345/659 |
| 8,943,580 B2 * | 1/2015 | Fadell | .................. | G06F 21/316 726/19 |
| 2004/0239690 A1 * | 12/2004 | Wyatt | .................... | G06T 3/606 345/649 |
| 2013/0069988 A1 * | 3/2013 | Kamei | .................. | G06F 1/1637 345/658 |

(Continued)

FOREIGN PATENT DOCUMENTS

| | | |
|---|---|---|
| JP | 2000-312329 A | 11/2000 |
| JP | 2008-177819 A | 7/2008 |
| JP | 2013-150129 A | 8/2013 |

*Primary Examiner* — Rodney Amadiz
(74) *Attorney, Agent, or Firm* — Canon USA, Inc., IP Division

(57) ABSTRACT

In a case where an orientation of a display control apparatus is a first orientation, a first display object is displayed in a first direction; in a case where the orientation of the display control apparatus changes to a second orientation without a specific operation performed, the first display object is displayed in a second direction; when a switch instruction to switch a display object is given in this state, a second display object is displayed in the second direction; in a case where the orientation of the display control apparatus changes to the second orientation with the specific operation performed, the display direction of the first display object is not changed; and when the switch instruction is given in this state, the second display object is displayed in the first direction.

22 Claims, 15 Drawing Sheets

(56) References Cited

U.S. PATENT DOCUMENTS

| | | | |
|---|---|---|---|
| 2013/0201092 A1* | 8/2013 | Prakash | G06F 3/0483 345/156 |
| 2013/0265250 A1* | 10/2013 | Ishikawa | G06F 3/041 345/173 |
| 2015/0116365 A1* | 4/2015 | Ding | G06F 3/0487 345/659 |
| 2015/0161767 A1* | 6/2015 | Monden | G06T 3/60 345/428 |
| 2015/0193913 A1* | 7/2015 | Funada | G06T 3/60 345/634 |
| 2015/0378520 A1* | 12/2015 | Chandrasekaran | G06F 3/0482 715/716 |

* cited by examiner

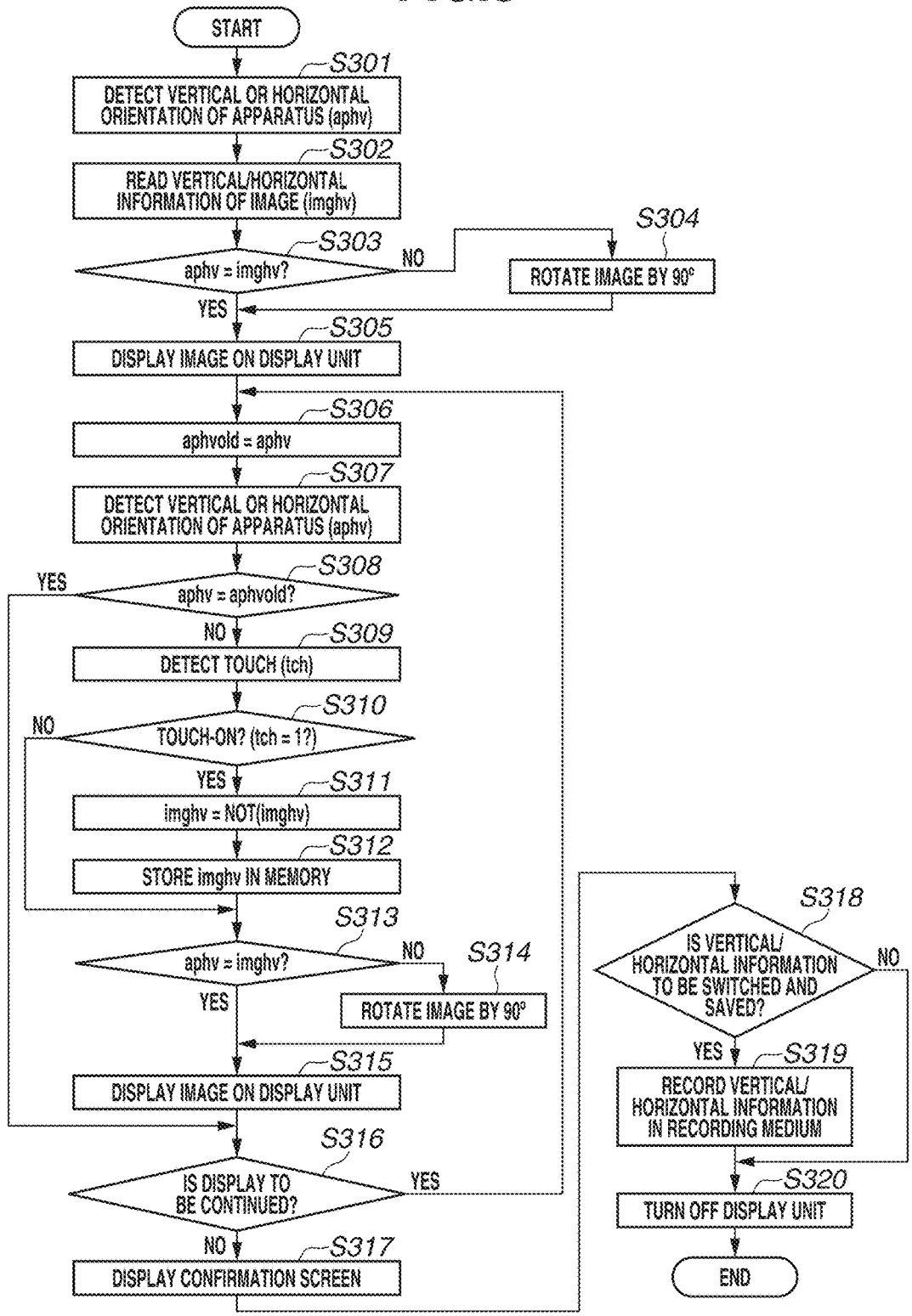

imghv = 1 aphv = 1, imghv = 1 aphv = 0, imghv = 1 imghv = 0 aphv = 0, imghv = 0 aphv = 1, imghv = 0

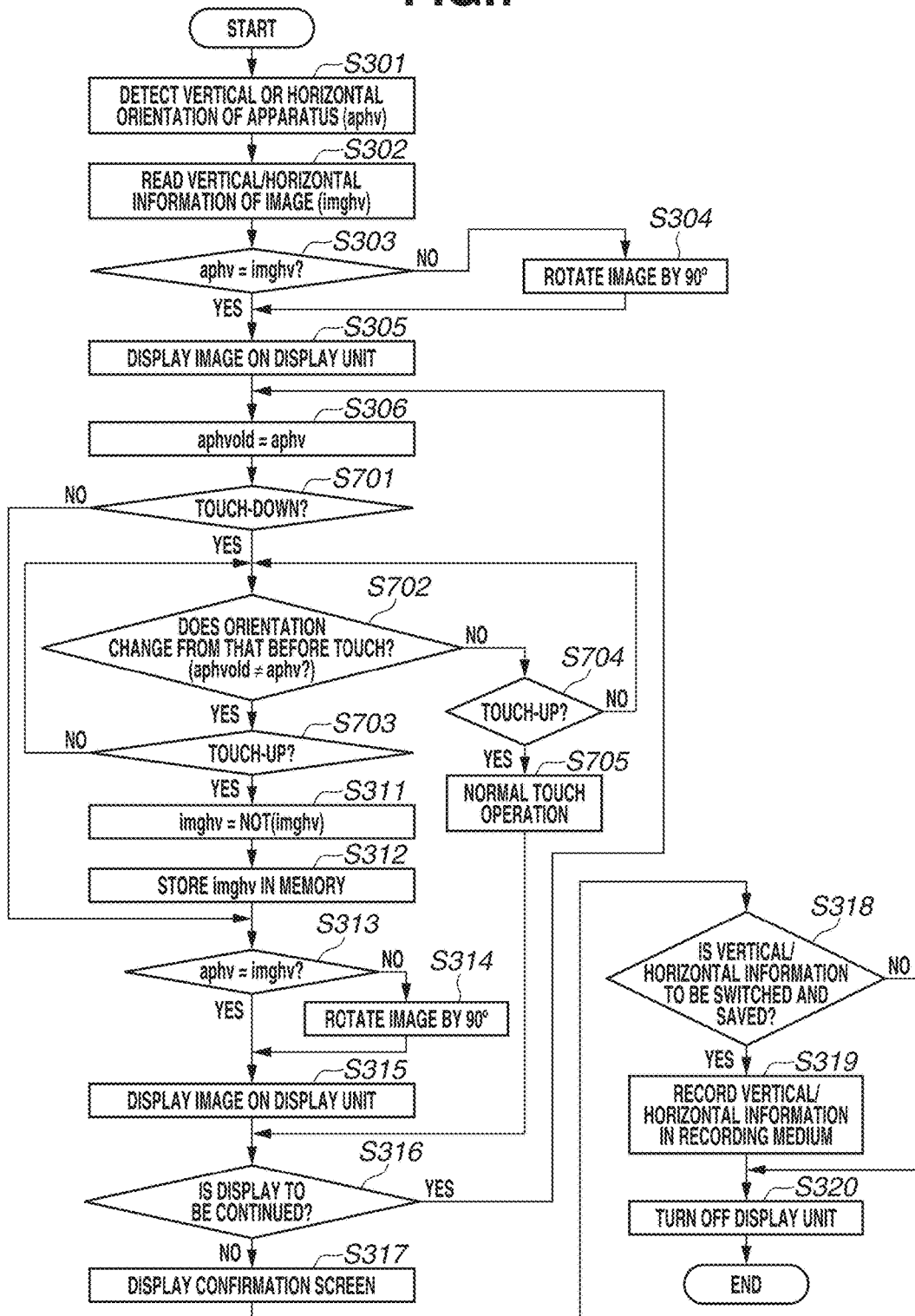

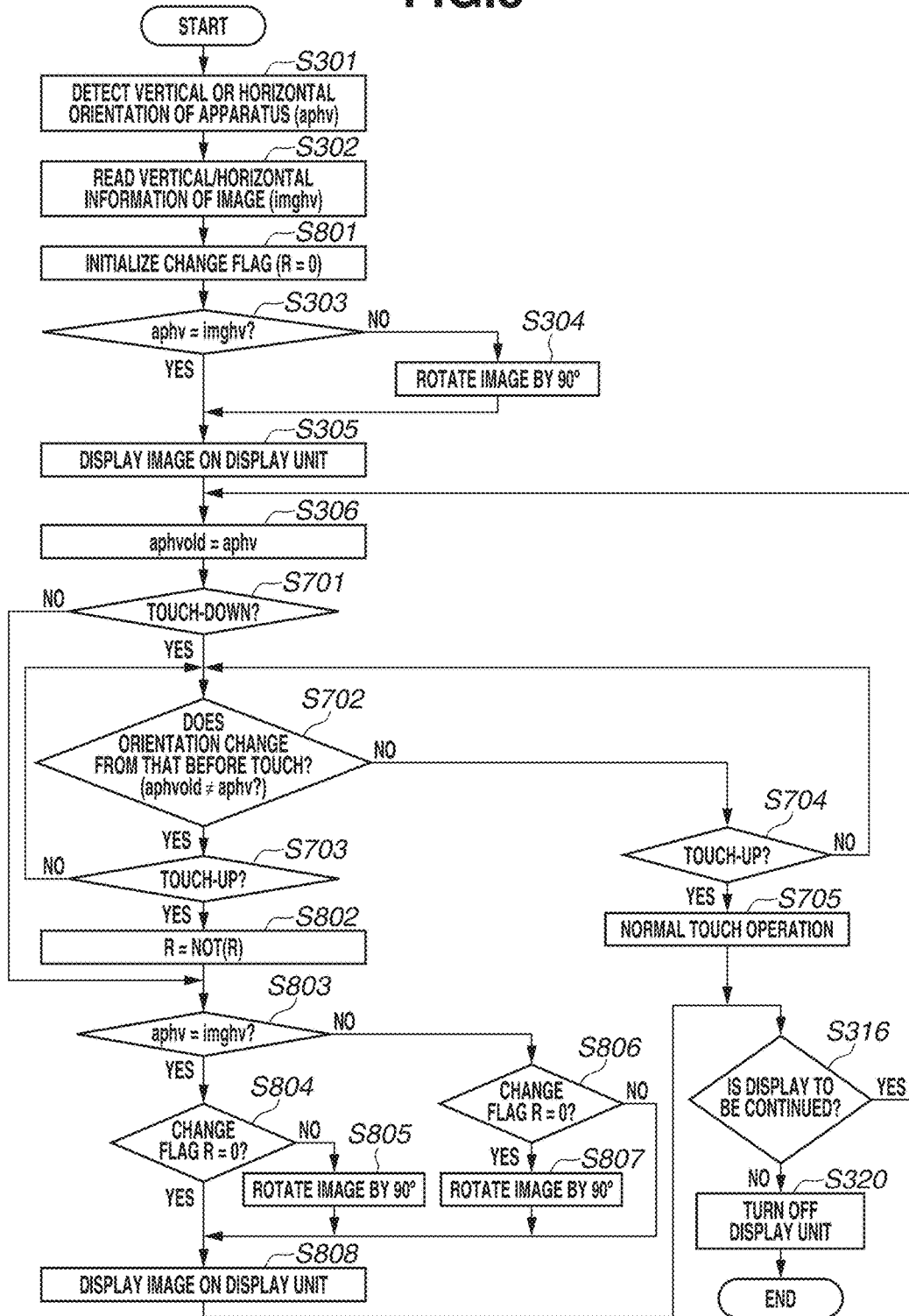

FIG.11B

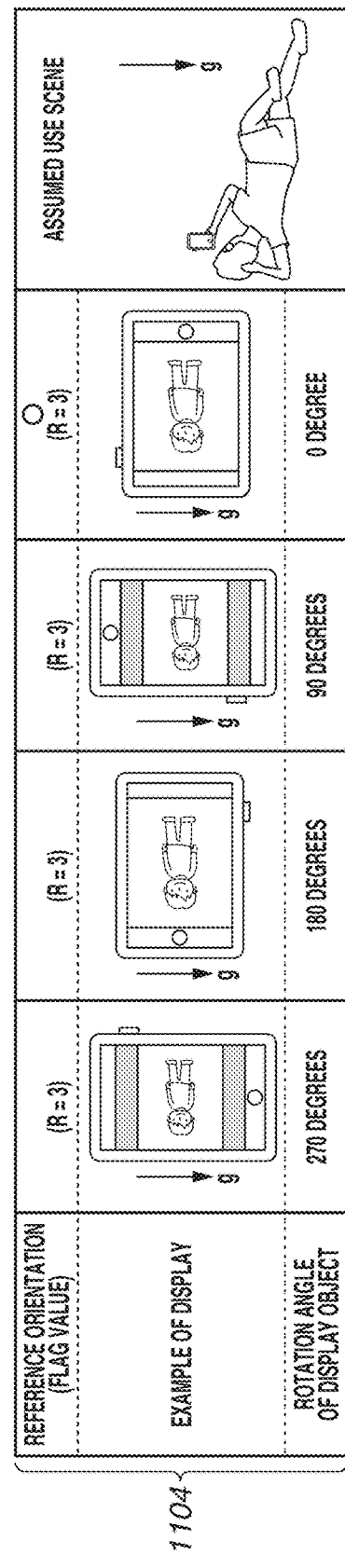

DISPLAY CONTROL APPARATUS AND METHOD FOR CONTROLLING THE SAME BASED ON ORIENTATION

BACKGROUND OF THE INVENTION

Field of the Invention

The present invention relates to a display control apparatus and a method for controlling the same, and in particular, relates to a technique regarding control performed based on the orientation of an apparatus.

Description of the Related Art

Imaging apparatuses or display apparatuses that perform control based on orientation information detected via an orientation detection unit are conventionally known. The imaging apparatus gives variety to the weighting of photometric evaluation and object detection, or records an image capture orientation in association with an image and uses the recorded image capture orientation to assist rotation display when the image is reproduced. Further, the display apparatus detects the orientation of the display apparatus when an image is reproduced. Then, the display apparatus changes the display direction of the image and displays the image on a display unit.

Japanese Patent Application Laid-Open No. 2000-312329 discusses an image processing apparatus that performs, based on the result of determination of whether the orientation state of the apparatus when an image is reproduced coincides with the orientation state recorded together with captured image data when the image is captured, an image rotation process on the captured image data and displays the captured image data in a correct direction.

Meanwhile, there is a case where a user wishes to view an image in a display direction desired by the user, regardless of the orientation state of an apparatus.

Japanese Patent Application Laid-Open No. 2008-177819 discusses a mobile terminal apparatus that captures an image of the face of a user with a camera provided on the same side as a display unit, rotates the direction of the captured image according to the direction of the face of the user, and displays the resultant image on the display unit.

Japanese Patent Application Laid-Open No. 2013-150129 discusses a mobile terminal that rotates, based on the contact position of a hand holding a housing detected by a contact sensor disposed on the back surface of the housing, and the orientation of the housing, the direction of an image and displaying the resultant image on a display unit.

However, the mobile terminal apparatus discussed in Japanese Patent Application Laid-Open No. 2008-177819 requires a camera for capturing the image of the user. Further, even when displaying an image, the mobile terminal apparatus needs to start the camera to deal with the display.

Further, the mobile terminal discussed in Japanese Patent Application Laid-Open No. 2013-150129 functions only in a case where the housing is held in a specific pattern. Thus, the mobile terminal cannot deal with various holding forms of the housing.

As described above, there has been an issue that, with the conventional techniques, an image cannot be easily displayed in a display direction desired by a user.

SUMMARY OF THE INVENTION

The present invention is directed to a display control apparatus and a method for controlling the display control apparatus that are capable of displaying a display object in a display direction desired by a user.

According to an aspect of the present invention, a display control apparatus includes a display unit, a reception unit configured to receive a switch instruction to switch a display object to be displayed on the display unit from a first display object to a second display object, an orientation detection unit configured to detect an orientation of the display control apparatus, and a control unit configured to perform control in such a manner that a direction of the display object displayed on the display unit is changed according to the orientation detected by the orientation detection unit, wherein the control unit: performs control in such a manner that, in a case where the display control apparatus is in a first orientation, the first display object is displayed on the display unit in a first direction with respect to the display unit, and in a case where the switch instruction is received in this state, the second display object is displayed on the display unit in the first direction; performs control in such a manner that, in the case where the display control apparatus is in the first orientation, the first display object is displayed on the display unit in the first direction with respect to the display unit, and in a case where the orientation of the display control apparatus changes from the first orientation to a second orientation, which is different from the first orientation by 90 degrees, in a state in which any specific operation is not performed, the first display object is displayed in a second direction, which is different from the first direction by 90 degrees, and in a case where the switch instruction is received in this state, the second display object is displayed in the second direction; and performs control in such a manner that, in the case where the display control apparatus is in the first orientation, the first display object is displayed on the display unit in the first direction with respect to the display unit, and in a case where the orientation of the display control apparatus changes from the first orientation to the second orientation in a state in which the specific operation is performed, the display direction of the first display object is not changed from the first direction, and in a case where the switch instruction is received in this state, the second display object is displayed in the first direction.

According to another aspect of the present invention, a display control apparatus includes a display unit, an orientation detection unit configured to detect an orientation of the display control apparatus, a setting unit configured to set any one of a plurality of states including at least a first state and a second state, and a control unit configured to perform control in such a manner that a direction in which a display object is displayed on the display unit is changed according to the orientation detected by the orientation detection unit and the state set by the setting unit, wherein the control unit performs control in such a manner that: in a case where the first state is set by the setting unit, the display object is displayed in a first direction in a case where the display control apparatus is in a first orientation, the display object is displayed in a second direction, which is different from the first direction by 270 degrees, in a case where the display control apparatus is in a second orientation, which is different from the first orientation by 90 degrees, and the display object is displayed in a third direction, which is different from the first direction by 90 degrees, in a case where the display control apparatus is in a third orientation, which is different from the first orientation by 270 degrees; and in a case where the second state is set by the setting unit, the display object is displayed in the third direction in the case where the display control apparatus is in the first orientation, the display object is displayed in the first direction in the case where the display control apparatus is in the second orientation, and the display object is displayed in a fourth direction, which is different from the first direction by 180 degrees, in the case where the display control apparatus is in the third orientation.

According to yet another aspect of the present invention, a display control apparatus includes a display unit, an orientation detection unit configured to detect an orientation of the display control apparatus, and a control unit configured to perform control in such a manner that a direction of a display object displayed on the display unit is changed according to the orientation detected by the orientation detection unit, wherein the control unit performs control in such a manner that, in a case where the display control apparatus is in a first orientation, when a fact that the orientation of the display control apparatus changes to a second orientation, which is different from the first orientation in a vertical or horizontal direction of the display unit, without a specific operation being performed in a state in which the display object is displayed on the display unit in a first direction with respect to the display unit is detected, the display direction of the display object is changed to a second direction, which is different from the first direction by 90 degrees, and the display object is displayed in the second direction, and even when a fact that the orientation of the display control apparatus changes from the first orientation to the second orientation after the specific operation is performed in a state in which the display object is displayed in the first direction on the display unit is detected, the display direction of the display object is not changed from the first direction, and thereafter, when a fact that the orientation of the display control apparatus changes from the second orientation to the first orientation is detected, the display direction of the display object is changed to a third direction, which is different from the first direction by 90 degrees and different from the second direction by 180 degrees, and the display object is displayed in the third direction.

Further features of the present invention will become apparent from the following description of exemplary embodiments with reference to the attached drawings.

BRIEF DESCRIPTION OF THE DRAWINGS

FIG. 3 is a flowchart illustrating display control according to a first exemplary embodiment.

FIG. 7 is a flowchart illustrating display control according to a second exemplary embodiment.

FIG. 8 is a flowchart illustrating display control according to a third exemplary embodiment.

FIGS. 11A, 11B, and 11C are diagrams illustrating detected orientations and examples of display with respect to each reference orientation.

DESCRIPTION OF THE EMBODIMENTS

Exemplary embodiments of the present invention will be described in detail below with reference to the accompanying drawings. It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

A first exemplary embodiment of the present invention will be described in detail below with reference to the drawings. In the present exemplary embodiment, a case where a display control apparatus is applied to a display apparatus is described. Herein, the display apparatus is an apparatus that can be carried by a user, and is, for example, a mobile phone terminal such as a smartphone.

Figure 1A:
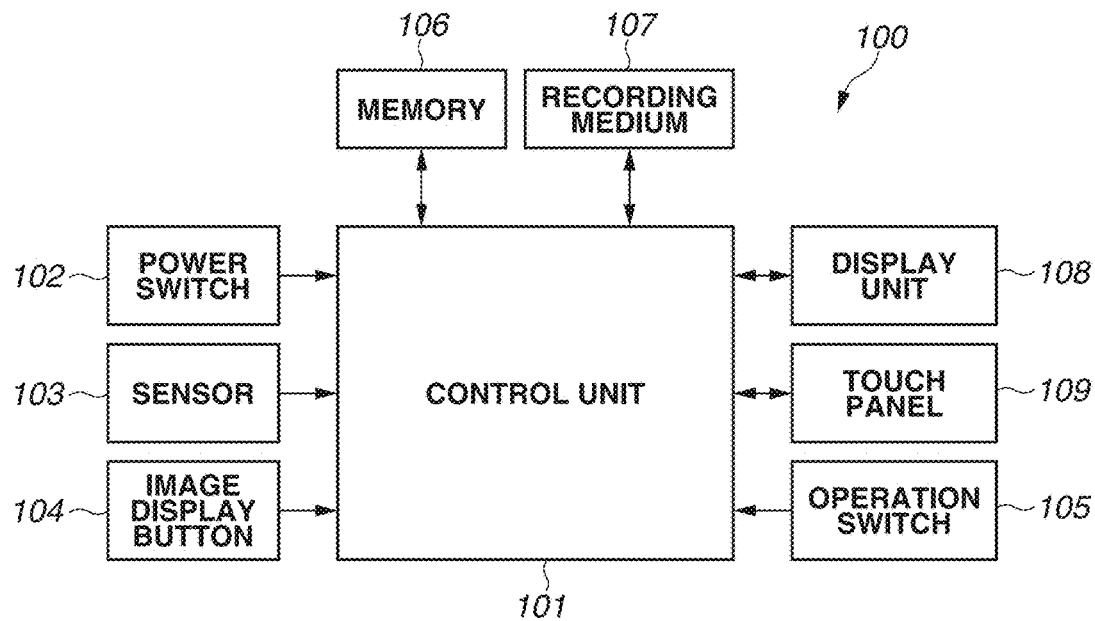
FIG. 1A is a diagram illustrating an overall configuration of a display apparatus.

FIG. 1A is a diagram illustrating an overall configuration of a display apparatus 100.

The display apparatus 100 includes a control unit 101, a power switch 102, a sensor 103, an image display button 104, an operation switch 105, a memory 106, a recording medium 107, a display unit 108, and a touch panel 109.

The control unit 101 is, for example, a central processing unit (CPU) and controls the entirety of the display apparatus 100. The power switch 102 is pressed by the user to turn on or off the display apparatus 100. The sensor 103 is, for example, at least any one of an acceleration sensor, a gyro sensor, and a geomagnetic sensor and outputs the orientation of the display apparatus 100. In this case, the sensor 103 outputs the vertical or horizontal orientation of the display apparatus 100 or outputs information regarding whether the display surface of the display unit 108 faces upward or downward. The image display button 104 is pressed by the user to display an image or a menu screen on the display unit 108. The operation switch 105 is pressed by the user to make various settings.

The memory 106 is, for example, a volatile memory such as a random-access memory (RAM), temporarily stores image data, a character, or a figure to be displayed, or temporarily stores the calculation result of the control unit 101. The recording medium 107 is, for example, a non-volatile memory such as a semiconductor memory, records data or a program necessary for control, or records image data. The recording medium 107 is an example of a recording unit. Specifically, as the recording medium 107, an Electrically Erasable Programmable Read-Only Memory (EEPROM) or a flash read-only memory (ROM) can be used. The recording medium 107 may be attachable to and detachable from the display apparatus 100. The display unit 108 is, for example, a thin-film transistor (TFT) and displays an image or a menu screen.

The touch panel 109 is placed on the display surface of the display unit 108 and detects the contact or approach of a finger of the user or a pen with or to the display unit 108. For example, the touch panel 109 can be of any of various types such as a resistive type, an electrostatic capacitance type, a surface acoustic wave type, an infrared type, an electromagnetic induction type, an image recognition type, and a photosensor type. Although a method for detecting the presence of a touch according to the presence of the contact of the finger or the pen with the touch panel 109, or a method for detecting the presence of a touch according to the presence of the approach of the finger or the pen to the touch panel 109 is employed depending on the type, either of the methods can be used.

The control unit 101 determines the following operations and states (a) to (e) of the user via the touch panel 109:
(a) The state where the finger or the pen that has not touched the touch panel 109 newly touches the touch panel 109, i.e., the start of a touch (referred to as a "touch-down");
(b) The state where the finger or the pen touches the touch panel 109 (referred to as a "touch-on");
(c) The state of moving the finger or the pen while the finger or the pen keeps touching the touch panel 109 (referred to as a "touch move");
(d) The state of separating from the touch panel 109 the finger or the pen having touched the touch panel 109, i.e., the end of a touch (referred to as a "touch-up" or "the cancellation of a touch"); and
(e) The state where nothing touches the touch panel 109 (referred to as a "touch-off").

The control unit 101 is notified via an internal bus of the above operations and states (a) to (e) and the coordinate position where the finger or the pen touches the touch panel 109. Based on the information of which the control unit 101 is notified, the control unit 101 determines an operation of the user on the touch panel 109.

If detecting a touch-down, the control unit 101 also simultaneously detects a touch-on. Further, normally, after the touch-down, the control unit 101 continues to detect the touch-on unless the control unit 101 detects a touch-up. Further, in the state of detecting a touch move, the control unit 101 also detects a touch-on. Further, even if detecting a touch-on, the control unit 101 does not detect a touch move if the coordinate position is not moving. Further, after detecting a touch-up of all the fingers or the pen having touched the touch panel 109, the control unit 101 detects a touch-off.

In the case of a touch move, the control unit 101 can also determine, based on a change in the coordinate position, the moving direction of the finger or the pen moving on the touch panel 109 with respect to each of the vertical and horizontal components on the touch panel 109. Further, if detecting a continuous operation including a touch-down, a certain touch move, and a touch-up on the touch panel 109, the control unit 101 determines that the user draws a stroke. The operation of quickly drawing a stroke is referred to as a "flick". A flick is the operation of quickly moving the finger some distance while the finger keeps touching the touch panel 109, and then separating the finger from the touch panel 109 immediately after the quick movement. In other words, a flick is the operation of quickly tracing the touch panel 109 with the finger in a flipping manner. If detecting a touch move performed a predetermined distance or more at a predetermined speed or more and detecting a touch-up (the cancellation of the touch) immediately after the move, the control unit 101 determines that a flick is performed. Further, if detecting a touch move performed a predetermined distance or more at less than a predetermined speed, the control unit 101 determines that a drag is performed.

Figure 1B:
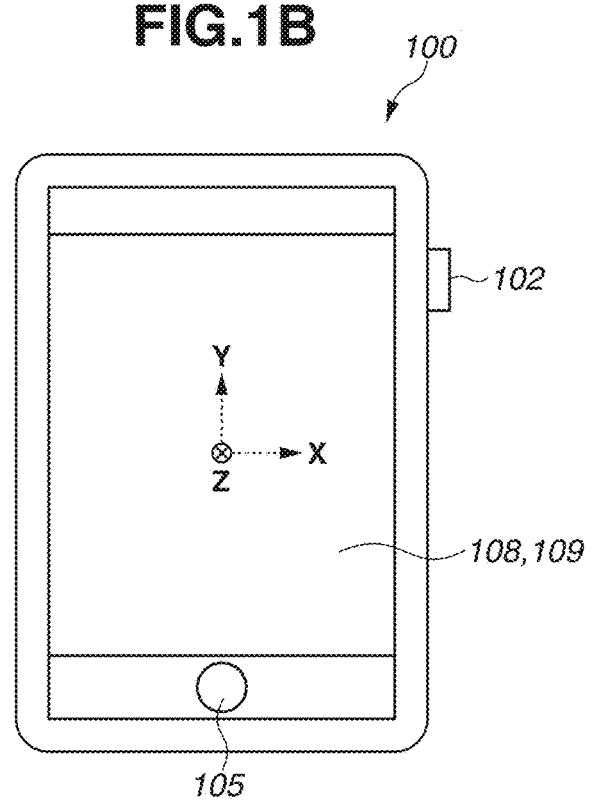
FIG. 1B is a diagram illustrating an external configuration of the display apparatus.

FIG. 1B is a diagram illustrating an external configuration of the display apparatus 100. The component members described above with reference to FIG. 1A are designated by the same numerals, and the description of these component members is appropriately omitted.

In the center of the display apparatus 100, the rectangular display unit 108 is located. The touch panel 109 is placed to be able to detect a touch on the display surface of the display unit 108. Further, on the right side of the display apparatus 100, the power switch 102 is placed, and on the lower side of the display unit 108, the operation switch 105 is placed.

Further, the display apparatus 100 itself is a vertically long rectangle of which the outline includes a long side and a short side. Similarly, the display unit 108 is also a rectangle of which the outline includes a long side and a short side. Typically, the orientation of the display apparatus 100 illustrated in FIG. 1B is referred to as a "vertical orientation", and an orientation obtained by rotating the display apparatus 100 by 90° from the state illustrated in FIG. 1B is referred to as a "horizontal orientation". In the present exemplary embodiment, it is assumed that in a case where the display apparatus 100 is in the vertical orientation, the display apparatus 100 is at a normal position.

Next, a description is given of the operation in which the sensor 103 outputs the orientation of the display apparatus 100. A case where the sensor 103 is a three-axis acceleration sensor is described.

The sensor 103 outputs information regarding three axes, namely an X-axis, a Y-axis, and a Z-axis. In this case, the X-axis is an axis parallel to the display surface and also parallel to the short side of the outline of the display apparatus 100. Further, the Y-axis is an axis parallel to the display surface and also parallel to the long side of the outline of the display apparatus 100. Further, the Z-axis is an axis orthogonal to the display surface, i.e., an axis orthogonal to the X-axis and the Y-axis.

Figure 2A:
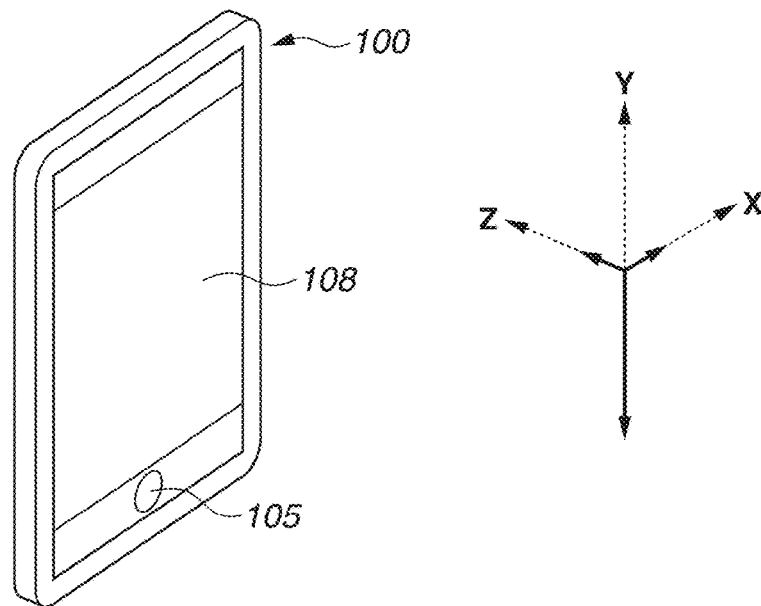
FIGS. 2A to 2C are diagrams illustrating an operation of a sensor.
Figure 2B:
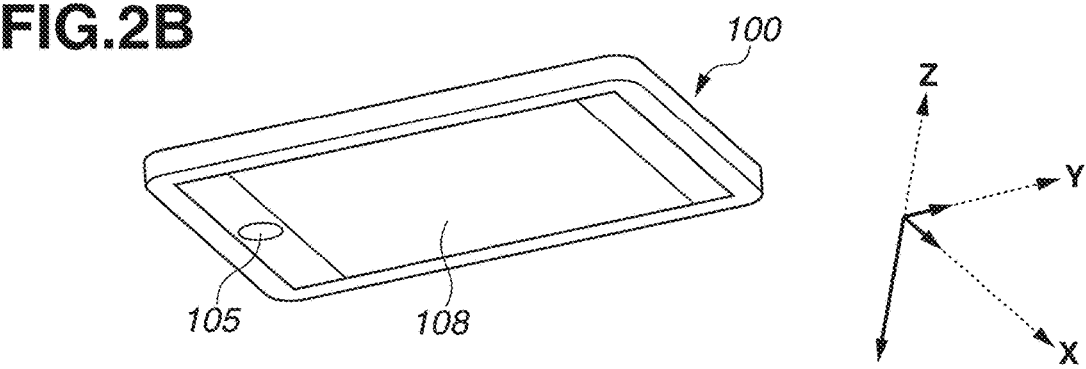
Figure 2C:
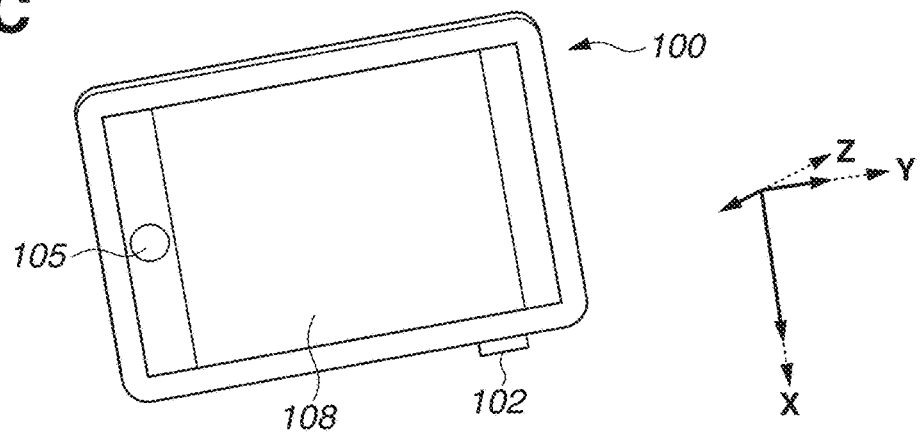

FIGS. 2A to 2C are diagrams illustrating an operation of the sensor 103. FIGS. 2A to 2C illustrate the outputs of the sensor 103 when the orientation of the display apparatus 100 is changed. In this case, the X-axis, the Y-axis, and the Z-axis are indicated by dashed arrows, and the length of each dashed arrow is set to "1", which is the maximum level with respect to gravity. Meanwhile, the outputs regarding the X-axis, the Y-axis, and the Z-axis of the sensor 103 are indicated by solid arrows, and the lengths of the solid arrows correspond to the respective output values. Based on the output values from the sensor 103, the control unit 101 detects the orientation of the display apparatus 100.

FIG. 2A is a diagram illustrating the outputs of the sensor 103 when the display apparatus 100 is in the vertical orientation. As illustrated in FIG. 2A, if the display apparatus 100 is in the vertical orientation, the output value of the Y-axis is approximately "−1", while the output values of the X-axis and the Z-axis are approximately "0". Based on the output values of the X-axis, the Y-axis, and the Z-axis, the control unit 101 determines that the display apparatus 100 is in the vertical orientation.

FIG. 2B is a diagram illustrating the outputs of the sensor 103 when the display surface of the display unit 108 of the display apparatus 100 faces downward. As illustrated in FIG. 2B, if the display surface faces downward, the output value of the Z-axis is approximately "−1", while the output values of the X-axis and the Y-axis are approximately "0". If the display surface faces upward, the output value of the Z-axis is approximately "1".

FIG. 2C is a diagram illustrating the outputs of the sensor 103 when the display apparatus 100 is in the horizontal orientation (the power switch 102 is directed downward). As illustrated in FIG. 2C, if the display apparatus 100 is in the horizontal orientation, the output value of the X-axis is approximately "1", while the output values of the Y-axis and the Z-axis are values close to "0". Based on the output values of the X-axis, the Y-axis, and the Z-axis, the control unit 101 determines that the display apparatus 100 is in the horizontal orientation. If the power switch 102 is directed upward, the output value of the X-axis is approximately "−1".

Next, display control of the display apparatus 100 is described with reference to a flowchart illustrated in FIG. 3. The processing illustrated in the flowchart of FIG. 3 is implemented by the control unit 101 loading a program recorded in the recording medium 107 into the memory 106 and executing the program. Further, the flowchart in FIG. 3 is started in response to an instruction to display on the display unit 108 an image recorded in the recording medium 107. In the present exemplary embodiment, a case where one of a plurality of images recorded in the recording medium 107 is displayed is described.

In step S301, based on the outputs of the sensor 103, the control unit 101 detects the orientation of the display apparatus 100. This processing corresponds to an example of the processing of an orientation detection unit. At this time, the control unit 101 detects whether the display apparatus 100 is in the vertical orientation or the horizontal orientation. Then, the control unit 101 stores an orientation flag aphv according to the detected orientation, as orientation information in the memory 106.

More specifically, if the absolute value of the output value of the Y-axis from the sensor 103 is greater than the absolute value of the output value of the X-axis from the sensor 103, the control unit 101 determines that the display apparatus 100 is in the vertical orientation. In this case, the control unit 101 sets the orientation flag aphv to "0", which indicates the vertical orientation. Then, the control unit 101 stores the set orientation flag aphv in the memory 106.

On the other hand, if the absolute value of the output value of the Y-axis from the sensor 103 is smaller than the absolute value of the output value of the X-axis from the sensor 103, the control unit 101 determines that the display apparatus 100 is in the horizontal orientation. In this case, the control unit 101 sets the orientation flag aphv to "1", which indicates the horizontal orientation. Then, the control unit 101 stores the set orientation flag aphv in the memory 106.

In step S302, the control unit 101 reads from the recording medium 107 an image to be displayed and stores the read image in the memory 106. The control unit 101 also reads image information (attribute information) associated with the image. At this time, the control unit 101 detects whether vertical/horizontal information (orientation information) included in the read image information indicates the vertical direction or the horizontal direction. Next, the control unit 101 stores in the memory 106 a vertical/horizontal display flag imghv according to the vertical/horizontal information.

Figure 4A:
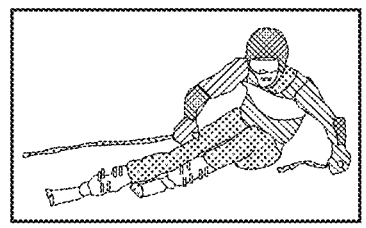
FIGS. 4A to 4C are diagrams illustrating examples of display of an image.
Figure 5A:
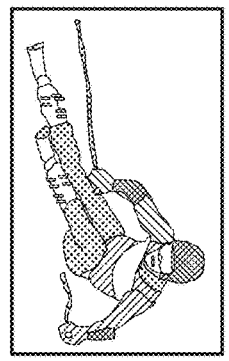
FIGS. 5A to 5C are diagrams illustrating examples of display of an image.

More specifically, if the vertical/horizontal information indicates the vertical direction, the control unit 101 sets the vertical/horizontal display flag imghv to "0" and stores the set vertical/horizontal display flag imghv. If, on the other hand, the vertical/horizontal information indicates the horizontal direction, the control unit 101 sets the vertical/horizontal display flag imghv to "1" and stores the set vertical/horizontal display flag imghv. At this time, if the image is directed horizontally as illustrated in FIG. 4A, the image is associated with the vertical/horizontal information indicating the horizontal direction. If the image is directed vertically as illustrated in FIG. 5A, the image is associated with the vertical/horizontal information indicating the vertical direction.

In step S303, the control unit 101 compares the value of the orientation flag aphv with the value of the vertical/horizontal display flag imghv, thereby determining whether the values are the same. If the values are different (NO in step S303), the processing proceeds to step S304. If the values are the same (YES in step S303), the processing proceeds to step S305.

In step S304, the control unit 101 rotates the image by 90° to change the display direction of the image and stores the rotated image in the memory 106. For example, the control unit 101 makes a calculation to rotate image data by 90° and thereby can rotate the image by 90°. The determination of whether to rotate the image by 90° clockwise or rotate the image by 90° counterclockwise depends on the orientation of the display apparatus 100 detected by the sensor 103. More specifically, if the display apparatus 100 is directed in a direction in which the display apparatus 100 is rotated by 90° clockwise relative to the normal position, the control unit 101 rotates the image data by 90° counterclockwise. If the display apparatus 100 is directed in a direction in which the display apparatus 100 is rotated by 90° counterclockwise relative to the normal position, the control unit 101 rotates the image data by 90° clockwise. Hereinafter, it is assumed that a rotation by 90° varies according to the orientation of the display apparatus 100.

In step S305, the control unit 101 displays on the display unit 108 the image stored in the memory 106.

A specific description is given of the image displayed on the display unit 108 through the processes of steps S301 to S305.

FIG. 4A illustrates an image associated with vertical/horizontal information indicating the horizontal direction.

Figure 4B:
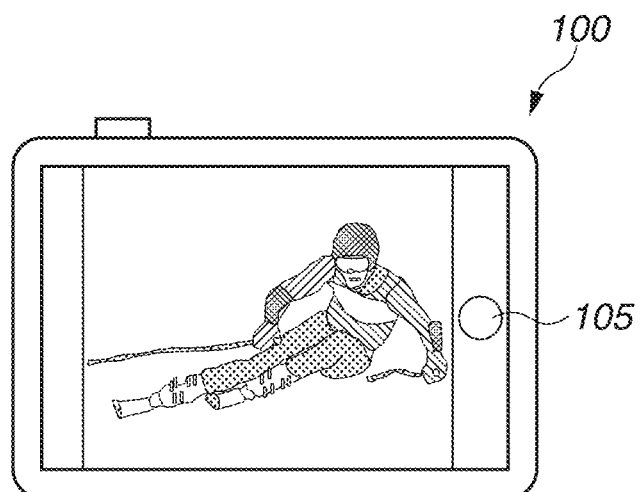

First, suppose that as illustrated in FIG. 4B, the display apparatus 100 is in the horizontal orientation. In this case, in step S301, the control unit 101 detects that the display apparatus 100 is in the horizontal orientation. Then, the control unit 101 sets the orientation flag aphv to "1" and stores the set orientation flag aphv. In step S302, the control unit 101 detects that the vertical/horizontal information of the image in FIG. 4A indicates the horizontal direction. Then, the control unit 101 sets the vertical/horizontal display flag imghv to "1" and stores the set vertical/horizontal display flag imghv. In step S303, the control unit 101 determines that the value of the orientation flag aphv and the value of the vertical/horizontal display flag imghv are the same. Then, the processing proceeds to step S305. In step S305, the control unit 101 displays the image as it is on the display unit 108 such that the direction of the image matches the display unit 108, without rotating the image. Thus, as illustrated in FIG. 4B, the image directed in the horizontal direction is displayed on the display apparatus 100 in the horizontal orientation.

Figure 4C:
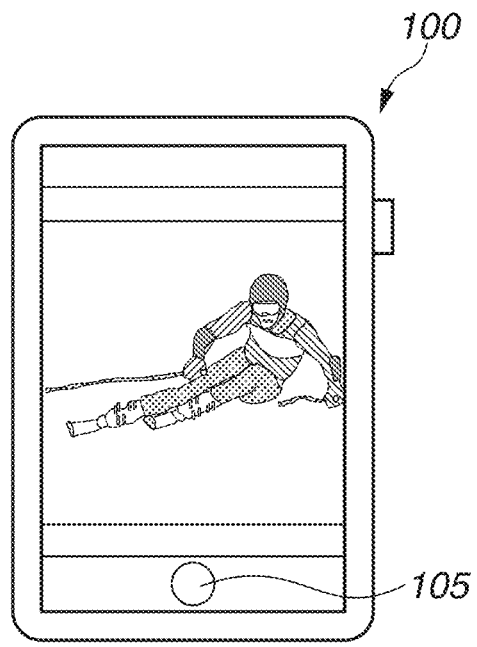

Next, suppose that as illustrated in FIG. 4C, the display apparatus 100 is in the vertical orientation. In this case, in step S301, the control unit 101 detects that the display apparatus 100 is in the vertical orientation. Then, the control unit 101 sets the orientation flag aphv to "0" and stores the set orientation flag aphv. In step S302, the control unit 101 detects that the vertical/horizontal information of the image in FIG. 4A indicates the horizontal direction. Then, the control unit 101 sets the vertical/horizontal display flag imghv to "1" and stores the set vertical/horizontal display flag imghv. In step S303, the control unit 101 determines that the value of the orientation flag aphv and the value of the vertical/horizontal display flag imghv are different. Then, the processing proceeds to step S304. In step S304, the control unit 101 rotates the image by 90°. In step S305, the control unit 101 displays the rotated image on the display unit 108. Thus, as illustrated in FIG. 4C, the image directed in the horizontal direction is displayed on the display apparatus 100 in the vertical orientation, as the image rotated by 90° relative to that in FIG. 4B.

As described above, even if the display apparatus 100 is in either of the vertical orientation and the horizontal orientation, the image is displayed in a display direction desired by the user.

On the other hand, FIG. 5A illustrates an image that should be associated with vertical/horizontal information indicating the horizontal direction as in FIG. 4A by rights, but is erroneously associated with vertical/horizontal information indicating the vertical direction.

Figure 5B:
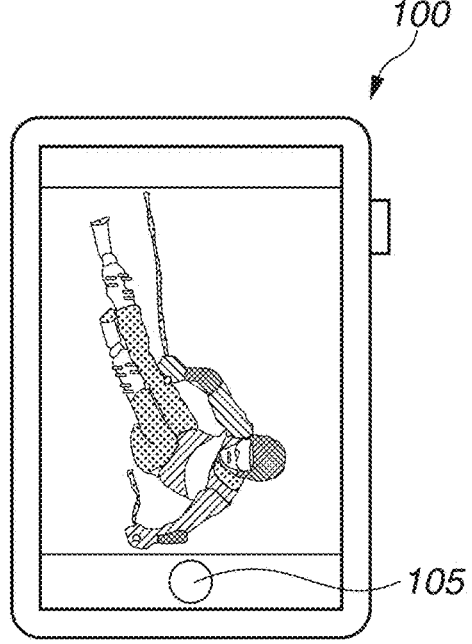

First, suppose that as illustrated in FIG. 5B, the display apparatus 100 is in the vertical orientation. In this case, after steps S301 and S302 and in step S303, the control unit 101 determines that the value of the orientation flag aphv and the value of the vertical/horizontal display flag imghv are both "0" and therefore are the same. Then, the processing proceeds to step S305. In step S305, the control unit 101 displays the image as it is on the display unit 108 such that the direction of the image matches the display unit 108, without rotating the image. Thus, as illustrated in FIG. 5B, the image directed in the vertical direction is displayed on the display apparatus 100 in the vertical orientation.

Figure 5C:
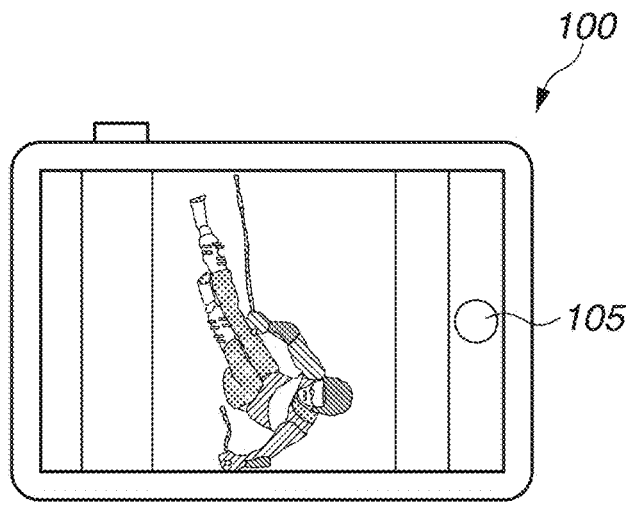

Next, suppose that as illustrated in FIG. 5C, the display apparatus 100 is in the horizontal orientation. In this case, after steps S301 and S302 and in step S303, the control unit 101 determines that the value of the orientation flag aphv and the value of the vertical/horizontal display flag imghv are different. Then, the processing proceeds to step S304. In step S304, the control unit 101 rotates the image by 90°. In step S305, the control unit 101 displays the rotated image on the display unit 108. Thus, as illustrated in FIG. 5C, the image directed in the vertical direction is displayed on the display apparatus 100 in the horizontal orientation, as the image rotated by 90° relative to that in FIG. 5B.

As described above, since the image is associated with erroneous vertical/horizontal information, the image is not displayed in a display direction desired by the user even if the display apparatus 100 is in the vertical orientation or the horizontal orientation.

Next, in step S306 and thereafter in the flowchart in FIG. 3, the control unit 101 controls display in such a manner that the image is directed in a display direction desired by the user. In the processes of step S306 and thereafter, the control unit 101 continues to monitor whether the orientation of the display apparatus 100 changes over time, thereby repeating a loop.

In step S306, the control unit 101 substitutes the value of the orientation flag aphv for a past orientation flag aphvold, which indicates the orientation of the display apparatus 100 in the past.

In step S307, the control unit 101 detects the orientation of the display apparatus 100 and sequentially updates the orientation flag aphv according to the detected orientation.

In step S308, the control unit 101 determines whether the orientation of the display apparatus 100 changes. More specifically, the control unit 101 compares the values of the past orientation flag aphvold and the orientation flag aphv, thereby determining whether the values are the same. If the values are the same (YES in step S308), the processing proceeds to step S316. In step S316, the control unit 101 determines whether the display is to be continued. If the display is to be continued (YES in step S316), the processing returns to step S306. In step S306, the control unit 101 continues to display the image. If, on the other hand, the values are different (NO in step S308), i.e., if the display apparatus 100 changes from the vertical orientation to the horizontal orientation or from the horizontal orientation to the vertical orientation, the processing proceeds to step S309.

In step S309, the control unit 101 detects the state of the touch panel 109. Specifically, based on a notification from the touch panel 109, the control unit 101 detects a touch-on or a touch-off. This processing corresponds to an example of the processing of a touch detection unit. If detecting a touch-on, the control unit 101 sets a variable tch to "1". If a touch-on is not performed (a touch-off is performed), the control unit 101 sets the variable tch to "0". Then, the control unit 101 stores the set variable tch in the memory 106. The fact that the control unit 101 detects a touch-on means that the control unit 101 has previously detected a touch-down, and the touch panel 109 is in the state of being touched when the control unit 101 determines the change in the orientation in step S308, i.e., the touch panel 109 remains touched from before the change in the orientation.

In step S310, the control unit 101 determines whether a touch-on is detected. More specifically, the control unit 101 determines whether the variable tch is "1". In other words, at this time, it is determined whether a touch-on is performed on the touch panel 109 when the display apparatus 100 changes from the vertical orientation to the horizontal orientation or from the horizontal orientation to the vertical orientation. If a touch-on is detected (YES in step S310), the processing proceeds to step S311. If a touch-on is not detected (NO in step S310), the processing proceeds to step S313.

In step S311, the control unit 101 changes the vertical/horizontal information of the image. Specifically, if the vertical/horizontal display flag imghv of the image stored in the memory 106 is "1", the control unit 101 changes the vertical/horizontal display flag imghv to "0". If the vertical/horizontal display flag imghv is "0", the control unit 101 changes the vertical/horizontal display flag imghv to "1".

In step S312, the control unit 101 updates the changed vertical/horizontal display flag imghv and stores the updated vertical/horizontal display flag imghv in the memory 106.

In step S313, the control unit 101 compares the value of the orientation flag aphv with the value of the vertical/horizontal display flag imghv, thereby determining whether the values are the same. If the values are different (NO in step S313), the processing proceeds to step S314. If the values are the same (YES in step S313), the processing proceeds to step S315. If the processing proceeds from step S312 to step S313, the value of the vertical/horizontal display flag imghv is that of the vertical/horizontal display flag changed in step S311.

In step S314, the control unit 101 rotates the image by 90° to change the display direction of the image and stores the rotated image in the memory 106.

In step S315, the control unit 101 displays on the display unit 108 the image stored in the memory 106. This processing corresponds to an example of the processing of a control unit.

In step S316, the control unit 101 determines whether the display is to be continued. Specifically, the control unit 101 determines whether an instruction not to display the image is given by an operation of the user via the image display button 104 and is received. If the display is to be continued (YES in step S316), the processing proceeds to step S306. If the display is not to be continued (NO in step S316), the processing proceeds to step S317.

A description is given of a case where a touch-on is detected when a change in the orientation is detected and a case where a touch-on is not detected when a change in the orientation is detected.

If a touch-on is not detected when the control unit 101 detects a change in the orientation of the display apparatus 100, the processing proceeds through steps S306 to S310 to steps S313, S314, and S315. In this case, the image is displayed such that the display direction of the image relative to the display apparatus 100 is changed according to the change in the orientation of the display apparatus 100.

On the other hand, if a touch-on is detected when the control unit 101 detects a change in the orientation of the display apparatus 100, the processing proceeds through steps S306 to S312 to steps S313 and S315. In this case, the image is displayed such that the display direction of the image relative to the display apparatus 100 is not changed according to the change in the orientation of the display apparatus 100.

A specific description is given of an example of the image displayed on the display unit 108 through steps S306 to S312 and also through the processes of steps S313 and S315.

Figure 6A:
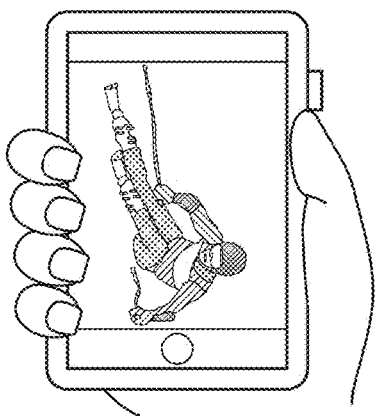
FIGS. 6A to 6F are diagrams illustrating examples of display of an image.

FIG. 6A illustrates a state similar to that described above with reference to FIG. 5B. In other words, the image illustrated in FIG. 5B is an image erroneously associated with vertical/horizontal information indicating the vertical direction, and the image is not displayed in a display direction desired by the user. The image may be not only an image associated with erroneous vertical/horizontal information but also an image not associated with vertical/horizontal information itself.

At this time, in the state in which the image is displayed on the display unit 108 as a result of step S305, the orientation flag aphv is stored as "0" in the memory 106, and the vertical/horizontal display flag imghv is stored as "0" in the memory 106. If the orientation of the display apparatus 100 does not change from this state, the past orientation flag aphvold is stored as "0" in step S306. Thus, as a result of the determination of a change in the orientation in step S308, the processing proceeds to step S316. Thus, the display direction of the image is not changed.

Figure 6D:
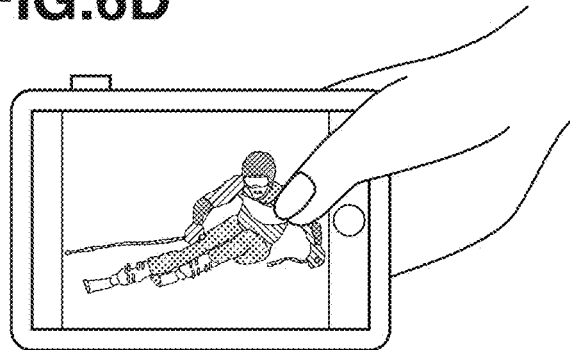
Figure 6B:
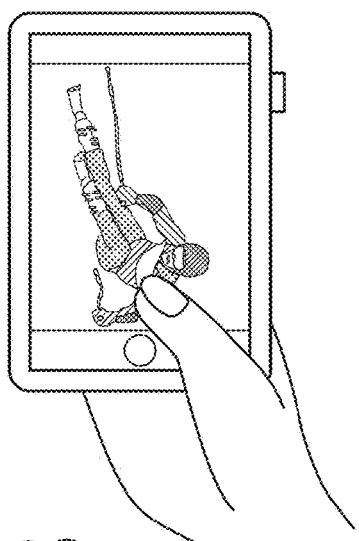
Figure 6E:
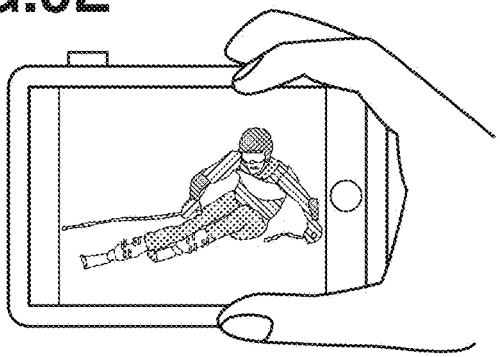
Figure 6C:
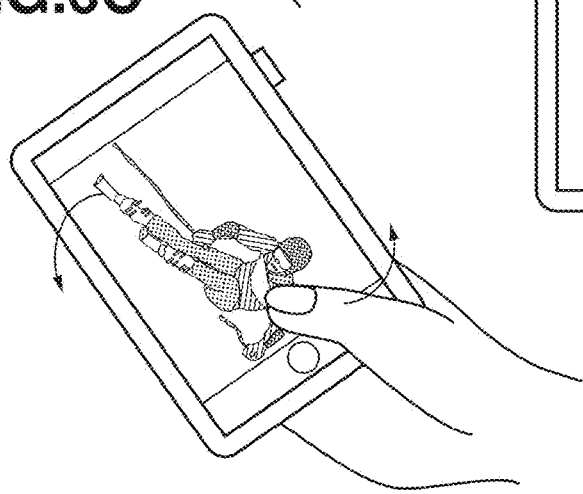

On the other hand, suppose that as illustrated in FIGS. 6B, 6C, and 6D, the user changes the display apparatus 100 from the vertical orientation to the horizontal orientation while keeping touching the touch panel 109. In this case, in step S307, the control unit 101 updates the orientation flag aphv from "0" to "1". In step S308, the control unit 101 determines that the values of the past orientation flag aphvold and the orientation flag aphv are different. Thus, the processing proceeds to step S309. In step S309, the control unit 101 detects a touch-on performed by the user on the touch panel 109 and therefore sets the variable tch to "1". In step S310, the control unit 101 determines that the variable tch is "1". Thus, the processing proceeds to step S311. In steps S311 and S312, the control unit 101 updates the vertical/horizontal display flag imghv from "0" to "1", thereby changing the vertical/horizontal information. Then, the control unit 101 stores the changed vertical/horizontal information in the memory 106.

In step S313, the changed orientation flag aphv is "1", and the changed vertical/horizontal display flag imghv is "1". Thus, the control unit 101 determines that the values are the same. Thus, the processing proceeds to step S315. In step S315, the control unit 101 displays the image directed in the horizontal direction such that the direction of the image matches the display apparatus 100 in the horizontal orientation. That is, if an image in FIG. 6B is compared with an image in FIG. 6D, the display direction of the image relative to the display apparatus 100 is not changed. Thus, even in the case of an image associated with erroneous vertical/horizontal information, the user changes the display apparatus 100 from the vertical orientation to the horizontal orientation or from the horizontal orientation to the vertical orientation while performing a touch-on on the touch panel 109, thereby displaying the image in a display direction desired by the user.

Next, a case where as illustrated in FIG. 6E, the user separates the finger from the touch panel 109, and a touch-off is detected is assumed. If the user separates the finger from (performs a touch-up on) the touch panel 109 in the state of FIG. 6D and holds the display apparatus 100 in an orientation as illustrated in FIG. 6E, the orientation of the display apparatus 100 does not change from that before the touch-up. In this case, a loop is executed such that the processing proceeds from step S316 to steps S306 and S307, the determination is Yes in step S308, and the processing proceeds to step S316. Thus, the processing does not proceed through step S314, in which a rotation process is performed. Thus, as illustrated in FIG. 6E, the control unit 101 displays the image while maintaining the display direction of the image in FIG. 6D, and does not change the display direction of the image. If the user changes the manner of holding the display apparatus 100 to change the orientation of the display apparatus 100 without touching the touch panel 109 after that, the determination is No in step S308. Since the user does not touch the touch panel 109, the control unit 101 determines in step S310 that a touch-on is not detected. Then, the processing proceeds to step S313. At this time, the value of the vertical/horizontal display flag imghv remains updated, i.e., remains "1". Further, since there is a change in the orientation, the orientation flag aphv is "0". Thus, in step S313, the control unit 101 determines that the value of the orientation flag aphv and the value of the vertical/horizontal display flag imghv are not the same. Thus, through step S314 and in step S315, the control unit 101 displays the image as in FIG. 4C. As described above, after the user rotates the display apparatus 100 while touching the touch panel 109 and separates the touch, and even if the display apparatus 100 is in either of the vertical orientation and the horizontal orientation, the image is displayed in a display direction desired by the user.

A case has been described where an image associated with erroneous vertical/horizontal information is displayed. However, also an image associated with correct vertical/horizontal information is similarly processed. Further, in the processes of steps S306 to S315, if the user merely touches the touch panel 109 without involving a change in the orientation of the display apparatus 100, the processing does not proceed from step S308 to step S309. Thus, the display direction of the image is not controlled.

Referring back to the flowchart in FIG. 3, in step S317, the control unit 101 displays on the display unit 108 a confirmation screen for confirming with the user whether the vertical/horizontal information of the image is to be recorded. Specifically, as illustrated in FIG. 6F, the control unit 101 displays a message "Do you switch and save vertical/horizontal information of image?" and options such as a dialog box on the image in a superimposed manner.

In step S318, the control unit 101 determines whether the vertical/horizontal information of the image is to be recorded in the recording medium 107. Specifically, the control unit 101 determines whether an option for saving the vertical/horizontal information of the image is selected, or an option for not saving the vertical/horizontal information of the image is selected. If the user makes a selection to record the vertical/horizontal information of the image (YES in step S318), the processing proceeds to step S319. If the user makes a selection not to record the vertical/horizontal information of the image (NO in step S318), the processing proceeds to step S320.

In step S319, the control unit 101 records the vertical/horizontal information stored in the memory 106, in association with the image in the recording medium 107. More specifically, based on the vertical/horizontal information stored in the memory 106, the control unit 101 updates the vertical/horizontal information (orientation information, rotation information, and angle information) of the image recorded as attribute information of an image file and records the updated vertical/horizontal information. It is only necessary to change the correspondence relationship between the direction of the image recorded in the image file and the orientation information included in the attribute information. Thus, the image itself may be subjected to a rotation process based on the vertical/horizontal information stored in the memory 106 and recorded without changing the record of the attribute information of the image file (i.e., the direction of the recorded image itself may be changed). Alternatively, instead of updating the already recorded orientation information of the image or changing (i.e., overwriting) the recorded direction of the image, an image file in which the orientation information is newly changed or an image file in which the recording direction of the image is changed may be created and recorded. For example, in the example of display illustrated in FIG. 6F, if the user makes a selection to record the vertical/horizontal information, the control unit 101 changes the image itself to the horizontal direction and also records vertical/horizontal information indicating the horizontal direction in association with the image in the recording medium 107. Thus, if the flowchart in FIG. 3 is started to display the same image next time, then in step S302, the vertical/horizontal information indicating the horizontal direction is read as image information associated with the image. Thus, in step S305, the image is displayed as in FIG. 4B or FIG. 4C from the start.

Figure 6F:
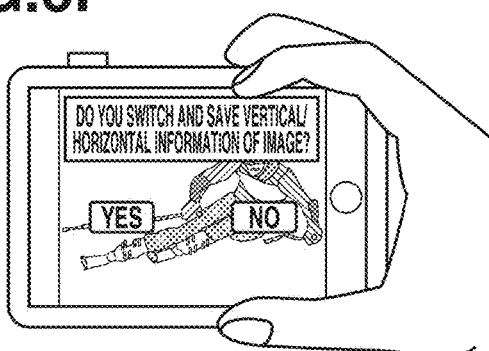

On the other hand, in the example of display illustrated in FIG. 6F, if the user makes a selection not to record the vertical/horizontal information, the process of step S319 is omitted. Thus, the image remains directed in the vertical direction, and the vertical/horizontal information indicating the vertical direction remains recorded in association with the image. Thus, if the flowchart in FIG. 3 is started to display the same image next time, then in step S302, the vertical/horizontal information indicating the vertical direction is read as image information associated with the image. Thus, in step S305, the image is displayed as in FIG. 5B or FIG. 5C.

Finally, in step S320, the control unit 101 turns off the display unit 108, thereby ending the flowchart in FIG. 3.

As described above, the user changes the orientation of the display apparatus 100 in the state of performing a touch-on on the touch panel 109, whereby the control unit 101 changes the correspondence relationship between the orientation of the display apparatus 100 and the display direction of an image relative to the display unit 108 before and after the change in the orientation of the display apparatus 100. Thus, it is possible to display the image in a direction desired by the user. Further, the operation of changing the orientation of the display apparatus 100 in the state of performing a touch-on on the touch panel 109 is intuitive and easily understandable. Thus, it is possible to improve the operability of the display apparatus 100.

Further, in the present exemplary embodiment, vertical/horizontal information associated with an image is changed, thereby controlling the display direction of the image such that only the image displayed on the display unit 108 is a target. Thus, even if a plurality of images is recorded, it is possible to prevent vertical/horizontal information of another image other than a displayed image from being changed.

The above processes of steps S317 to S319 may be omitted. In this case, even if the vertical/horizontal information of the image is changed in step S311, and if the processing proceeds to step S302 to display the same image next time, the vertical/horizontal information before being changed is read as vertical/horizontal information associated with the image.

Further, the above processes of steps S317 to S319 can be performed only if the processing proceeds through steps S311 and S312. In this case, only if the vertical/horizontal information of the image is changed, it is confirmed with the user whether the vertical/horizontal information of the image is to be switched and saved. Thus, it is possible to improve the operability of the display apparatus 100.

Further, in step S316, a case has been described where it is determined whether the display is to be continued. The present invention, however, is not limited to this case. Alternatively, it may be determined whether the user performs a flick on the touch panel 109 to give an instruction to perform image advancement. The image advancement refers to, in a case where a plurality of images are recorded in the recording medium 107 in order of the photographing date and time, a transition to a next image according to the order. If an instruction to perform image advancement is given, the processing may proceed to step S317. If an instruction to perform image advancement is not given, the processing may return to step S306. Thus, if an instruction to perform image advancement is given, then in step S317, the control unit 101 confirms with the user whether the vertical/horizontal information of the image before the image advancement is to be recorded.

Next, display control according to a second exemplary embodiment is described with reference to a flowchart illustrated in FIG. 7. In the first exemplary embodiment, a case where, if the control unit 101 detects a touch-on in step S310, the processing proceeds to the process of changing the vertical/horizontal information in step S311 has been described. In the present exemplary embodiment, a case where, if a touch-up is detected, the processing proceeds to step S311 is described. The processing illustrated in the flowchart of FIG. 7 is implemented by the control unit 101 loading a program recorded in the recording medium 107 into the memory 106 and executing the program. The flowchart in FIG. 7 is obtained by changing the processes of steps S307 to S310 in the flowchart in FIG. 3 described in the first exemplary embodiment to the processes of steps S701 to S705. Thus, in the flowchart in FIG. 7, processes similar to those in the flowchart in FIG. 3 are designated by the same step numbers and are not described here.

In step S701, based on a notification from the touch panel 109, the control unit 101 determines whether a touch-down is performed. If a touch-down is performed (YES in step S701), the processing proceeds to step S702. If a touch-down is not performed (NO in step S701), the processing proceeds to step S313. The processes of step S313 and thereafter are similar to those in the first exemplary embodiment.

In step S702, the control unit 101 detects the orientation of the display apparatus 100 and determines whether the orientation changes from the vertical orientation to the horizontal orientation or from the horizontal orientation to the vertical orientation as compared with that before the touch-down in step S701. Specifically, the control unit 101 compares the value of the past orientation flag aphvold before the touch-down is performed, with the value of the orientation flag aphv when the touch-down is performed. Then, the control unit 101 determines whether the values are the same. If the values are different, i.e., if the orientation changes (YES in step S702), the processing proceeds to step S703. If, on the other hand, the values are the same, i.e., if the orientation does not change (NO in step S702), the processing proceeds to step S704.

In step S703, based on a notification from the touch panel 109, the control unit 101 determines whether a touch-up is performed. If a touch-up is not performed (NO in step S703), there is a possibility that the orientation of the display apparatus 100 will change. Thus, the processing returns to step S702. If a touch-up is performed (YES in step S703), the processing proceeds to step S311. That is, the case where the processing proceeds to step S311 is a case where the orientation of the display apparatus 100 changes from the vertical orientation to the horizontal orientation or from the horizontal orientation to the vertical orientation before and after the touch-down is performed on the touch panel 109. The processes of step S311 and thereafter are similar to those in the first exemplary embodiment.

Also in step S704, based on a notification from the touch panel 109, the control unit 101 determines whether a touch-up is performed. If a touch-up is not performed (NO in step S704), there is a possibility that the orientation of the display apparatus 100 will change. Thus, the processing returns to step S702. If a touch-up is performed (YES in step S704), the processing proceeds to step S705. That is, the case where the processing proceeds to step S705 is a case where the orientation of the display apparatus 100 does not change before and after the touch-down is performed on the touch panel 109. In this case, a normal touch operation is performed.

Thus, in step S705, the control unit 101 performs processing according to the touch. Although the processing according to the touch is not described in detail, the control unit 101 may execute, for example, a function assigned to a display item at the position of the touch.

As described above, according to the present exemplary embodiment, until a touch-up is performed, it is determined whether the orientation of the display apparatus 100 changes. Then, based on the time when a touch-up is detected, the processing proceeds to the next step. Thus, until the user performs a touch-up, and the processing proceeds to the next step, the display apparatus 100 can omit display control according to the orientation of the display apparatus 100.

Next, display control according to a third exemplary embodiment is described with reference to a flowchart illustrated in FIG. 8. The processing illustrated in the flowchart of FIG. 8 is implemented by the control unit 101 loading a program recorded in the recording medium 107 into the memory 106 and executing the program. In the first and second exemplary embodiments, a case where vertical/horizontal information associated with an image is changed, thereby controlling the display direction of the image has been described. In the present exemplary embodiment, a case where the display direction of an image is controlled without changing vertical/horizontal information is described. The present exemplary embodiment is applied to, for example, a case where the user views an image displayed on the display unit 108 while lying down. The flowchart in FIG. 8 is obtained by adding step S801 to the flowchart in FIG. 7 described in the second exemplary embodiment and also changing the processes of steps S311 to S315 to the processes of steps S802 to S808. Thus, in the flowchart in FIG. 8, processes similar to those in the flowchart in FIG. 7 are designated by the same step numbers and are not described here.

First, with reference to FIG. 9, an example of use of the display apparatus 100 according to the present exemplary embodiment is described.

Figure 9A:
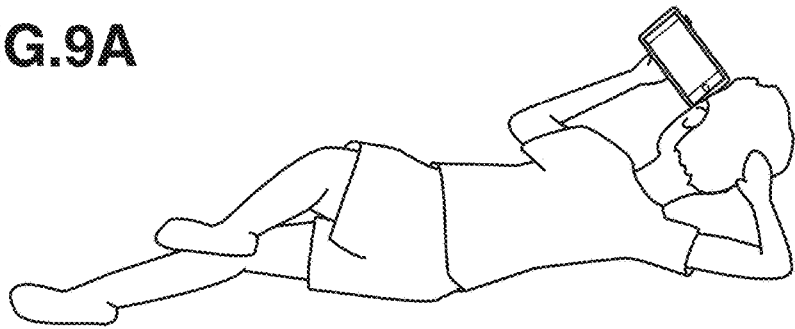
FIGS. 9A to 9E are diagrams illustrating examples of display of images.

FIG. 9A is a diagram illustrating the state where the user views an image displayed on the display unit 108 of the display apparatus 100 in the state of lying down. In a case where the user views the image while lying down, the display apparatus 100 is in the state of being tilted by the user. At this time, the control unit 101 detects that the display apparatus 100 is in the vertical orientation. In this state, however, in view of the relative value of the line of sight of the user, it is desirable to rotate the image by 90° and display the rotated image. In the present exemplary embodiment, an image is displayed based on change information for changing the correspondence relationship between the orientation of the display apparatus 100 and the display direction of the image relative to the display unit 108. This operation is specifically described below.

In step S801, to initialize a change flag R as change information, the control unit 101 substitutes 0 for the change flag R and stores the initialized change flag R in the memory 106. The change flag R refers to a flag indicating whether to change the correspondence relationship between the orientation of the display apparatus 100 and the display direction of the image relative to the display unit 108.

The processes of steps S303 to S705 are similar to those in the first and second exemplary embodiments.

In step S703, based on a notification from the touch panel 109, the control unit 101 determines whether a touch-up is performed. If a touch-up is performed (YES in step S703), the processing proceeds to step S802. That is, the case where the processing proceeds to step S802 is a case where the orientation of the display apparatus 100 changes from the vertical orientation to the horizontal orientation or from the horizontal orientation to the vertical orientation before and after the touch-down is performed on the touch panel 109.

In step S802, the control unit 101 inverts the change flag R stored in the memory 106. Specifically, if the change flag R stored in the memory 106 is "0", the control unit 101 sets the change flag R to "1". If the change flag R is "1", the control unit 101 sets the change flag R to "0". Then, the control unit 101 stores the inverted change flag R in the memory 106.

In step S803, the control unit 101 compares the value of the orientation flag aphv with the value of the vertical/horizontal display flag imghv, thereby determining whether the values are the same. If the values are the same (YES in step S803), the processing proceeds to step S804. If the values are different (NO in step S803), the processing proceeds to step S806.

In step S804, the control unit 101 determines whether the change flag R is "0". If the change flag R is "1" (NO in step S804), the processing proceeds to step S805. In step S805, the control unit 101 rotates the image by 90° to change the display direction of the image and stores the rotated image in the memory 106. If, on the other hand, the change flag R is "0" (YES in step S804), the control unit 101 does not perform the process of rotating the image, and the processing proceeds to step S808. That is, if the change flag R is "1", and even if the value of the orientation flag aphv and the value of the vertical/horizontal display flag imghv are the same, the control unit 101 rotates the image by 90° and displays the rotated image.

Also in step S806, similarly, the control unit 101 determines whether the change flag R is "0". If the change flag R is "0" (YES in step S806), the processing proceeds to step S807. In step S807, similarly to step S304, the control unit 101 rotates the image by 90° to change the display direction of the image and stores the rotated image in the memory 106. If, on the other hand, the change flag R is "1" (NO in step S806), the control unit 101 does not perform the process of rotating the image, and the processing proceeds to step S808. That is, if the change flag R is "1", and even if the value of the orientation flag aphv and the value of the vertical/horizontal display flag imghv are different, the control unit 101 does not perform the process of rotating the image.

Figure 9B:
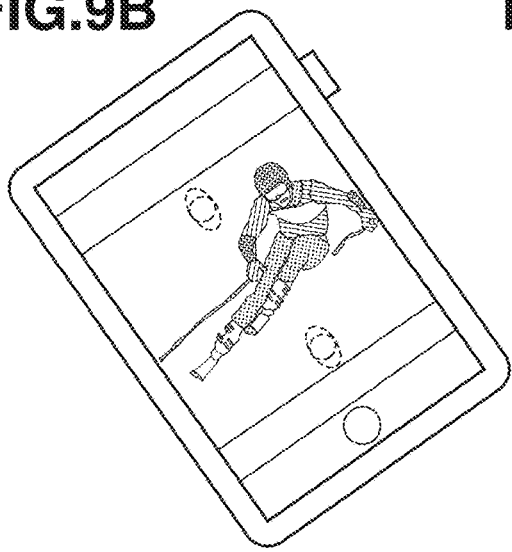

In step S808, the control unit 101 displays on the display unit 108 the image stored in the memory 106. With reference to FIGS. 9B and 9C, a case where the image illustrated in FIG. 4A is displayed is described. In FIGS. 9B and 9C, the orientation of the display apparatus 100 is detected as the vertical orientation.

First, FIG. 9B illustrates an example of display in a case where, after it is determined in step S701 that a touch-down is not performed on the touch panel 109, the processing does not proceed through step S802 (the value of the change flag R remains "0") and proceeds to step S803. That is, in step S803, the orientation flag aphv is "0", and the vertical/horizontal display flag imghv is "1". Thus, the values are different, and therefore, the processing proceeds to step S806. In step S806, the value of the change flag R is "0", and therefore, the control unit 101 rotates the image by 90°. Thus, as illustrated in FIG. 9B, the image is displayed in a display direction similar to that in FIG. 4C. In this case, if the user is lying down as illustrated in FIG. 9A, the line of sight of the user (dashed lines illustrated in FIG. 9B) does not match the display direction of the image.

On the other hand, FIG. 9C illustrates an example of display in a case where a touch-down is performed on the touch panel 109, for example, when the display apparatus 100 changes from the horizontal orientation to the vertical orientation while the user is lying down. Then, the processing proceeds through step S802 (the value of the change flag R is inverted to "1") and proceeds to step S803. That is, in step S803, the orientation flag aphv is "0", and the vertical/horizontal display flag imghv is "1". Thus, the values are different, and therefore, the processing proceeds to step S806. In step S806, the value of the change flag R is "1", and therefore, the control unit 101 does not rotate the image. Thus, as illustrated in FIG. 9C, the image is displayed in a display direction similar to that in FIG. 4B. In this case, if the user is lying down as illustrated in FIG. 9A, the line of sight of the user (dashed lines illustrated in FIG. 9C) matches the image and coincides with a display direction desired by the user.

Then, in step S316, the control unit 101 determines whether the display is to be continued. If the display is to be continued (YES in step S316), the processing returns to step S306. Then, the above processing is repeated. If the display is to be continued in step S316, the value of the change flag R remains "1" unless the processing proceeds through steps S306, S701, S702, and S703 to step S802 again. Thus, while the image continues to be displayed, and if the user performs a flick on the touch panel 109 to give an instruction to perform image advancement, the control unit 101 displays an image according to the maintained value of the change flag R.

Figure 9D:
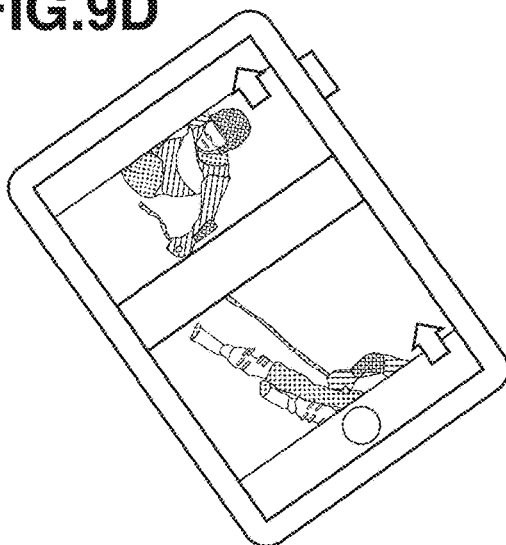
Figure 9C:
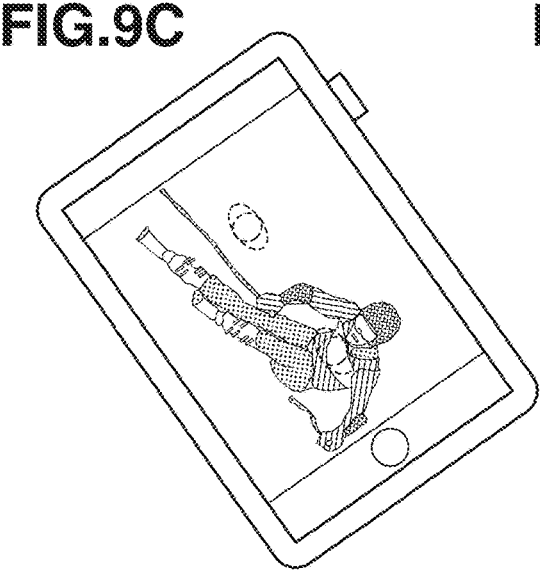

For example, suppose that in the state illustrated in FIG. 9C, the user performs a flick as in arrows in FIG. 9D. In response to the flick, the control unit 101 causes the image to transition to a next image and displays the next image on the display unit 108. This processing corresponds to an example of the processing of a transition unit. Also in this case, the control unit 101 displays an image according to the processes of steps S803 to S808 in the state in which the value of the change flag R is maintained. Thus, even if image advancement is performed, the display direction of an image to be displayed coincides with a display direction desired by the user.

Further, similarly, if the display is to be continued in step S316, the value of the change flag R remains "1" unless the processing proceeds to step S802 again. Thus, if the user gives, via the touch panel 109 or the operation switch 105, an instruction to display a setting screen (a menu screen) for setting the display of the image, the control unit 101 transitions to a setting screen according to the maintained value of the change flag R.

Figure 9E:
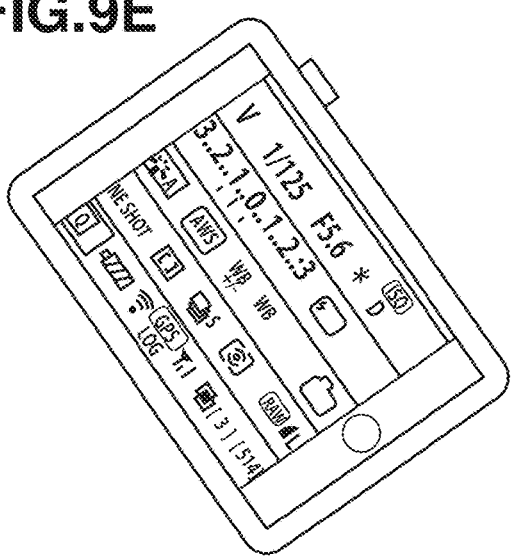

For example, suppose that in the state illustrated in FIG. 9C, the user gives via the operation switch 105 an instruction to display a setting screen. In this case, as illustrated in FIG. 9E, the control unit 101 displays a setting screen in the state in which the value of the change flag R is maintained. Thus, even if the setting screen is displayed, the display direction of the setting screen coincides with a display direction desired by the user.

As described above, the user changes the orientation of the display apparatus 100 in the state of performing a touch-on on the touch panel 109, whereby the control unit 101 changes the correspondence relationship between the orientation of the display apparatus 100 and the display direction of the image relative to the display unit 108 before and after the change in the orientation. Thus, it is possible to display the image in a direction desired by the user.

Further, in the present exemplary embodiment, the control unit 101 does not change vertical/horizontal information associated with an image, but changes the display direction of the image based on change information. By such processing, the control unit 101 performs control as if in an orientation different from the detected orientation of the display apparatus 100. Thus, even if not only an image (a first image) displayed at the current time but also a next different image (a second image) resulting from image advancement or a setting screen is displayed, it is possible to cause the display direction of the image to coincide with a display direction desired by the user.

Further, in the present exemplary embodiment, display is performed as if in an orientation different from the orientation of the display apparatus 100. Thus, for example, even if the user views an image while lying down, it is possible to display the image in a display direction desired by the user. If detecting via the sensor 103 that the display surface of the display apparatus 100 does not face downward, the control unit 101 can determine that the user changes from the state of lying down to the state of standing up, and the lying down ends. In this case, even if the display is to be continued in step S316, the control unit 101 initializes the change flag R. Thus, even if the lying down ends, it is possible to cause the display direction of the image to coincide with a display direction desired by the user.

Next, display control according to a fourth exemplary embodiment is described with reference to FIGS. 10 (10A and 10B), 11A, 11B, and 11C. In the present exemplary embodiment, for example, a case where, if the user views an image while lying down, and if the user rotates the display apparatus 100 according to a content displayed on the display unit 108 in the state of lying down, the image is displayed in a more appropriate direction is described. More specifically, the orientation of the display apparatus 100 as a reference (a reference orientation) is changed between a case where the user views the display apparatus 100 while standing upright, and a case where the user views the display apparatus 100 while lying down. The case where the user views the display apparatus 100 while lying down also includes two patterns, namely a lying down position in which the right eye of the user is on the lower side in the direction of gravity, and a lying down position in which the left eye of the user is on the lower side in the direction of gravity. Thus, different reference orientations are provided for these two respective patterns. It is assumed that the operation of changing reference orientations is performed by the operation of rotating the display apparatus 100 while keeping touching the touch panel 109 as in the first to third exemplary embodiments. The operation of changing reference orientations, however, is not limited to this. With respect to each reference orientation, the display direction of a content (an image) displayed on the display unit 108 is automatically rotated according to the direction of the display apparatus 100.

Figure 11A:
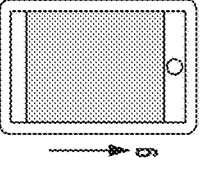
Figure 11B:
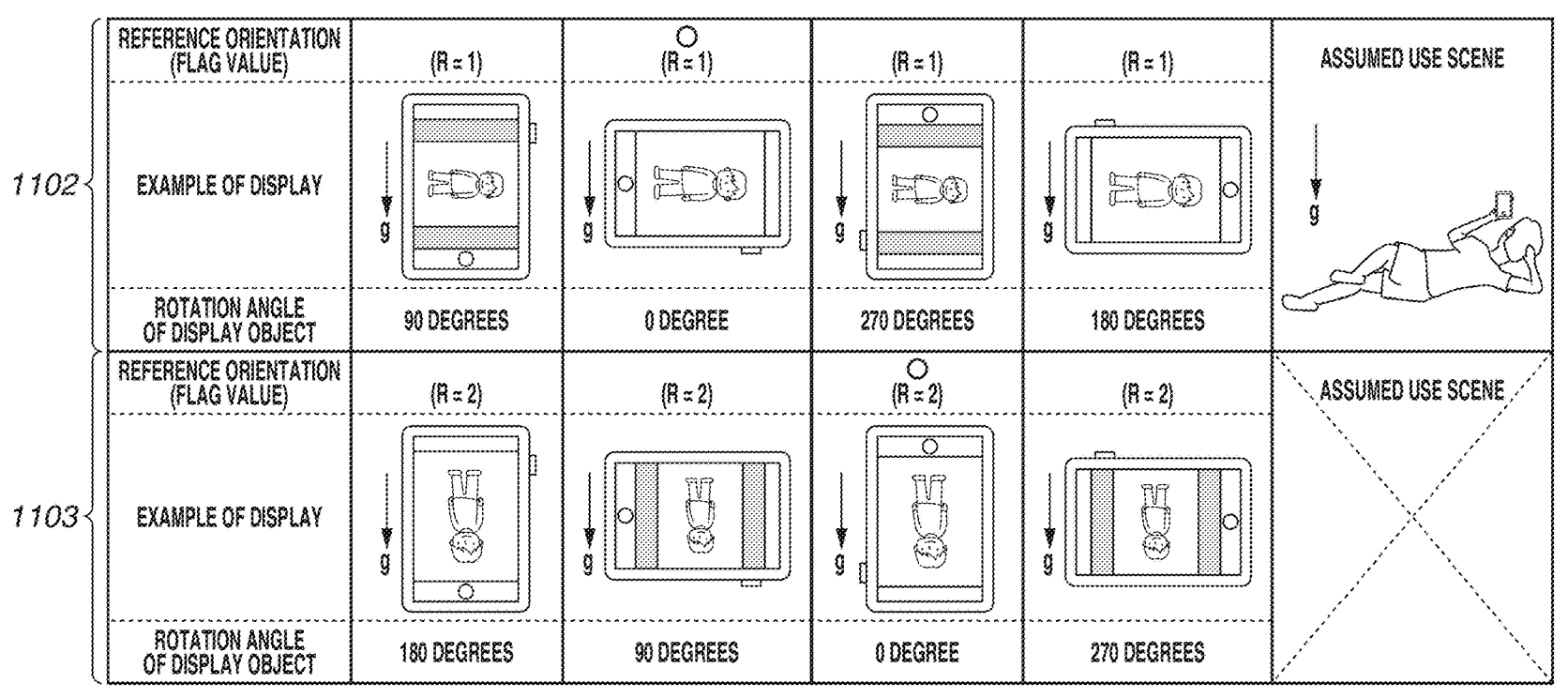

FIGS. 11A, 11B, and 11C are tables illustrating examples of display and the rotation angles (the display directions) of a content with respect to each orientation of the display apparatus 100 in the reference orientations according to the present exemplary embodiment.

In the columns of a row 1100, the definitions of four respective types of orientations of the display apparatus 100 are illustrated. As illustrated in the row 1100, based on the outputs of the sensor 103, the control unit 101 can distinguish which of the following four orientations the orientation of the display apparatus 100 is (to which of the following four orientations the orientation of the display apparatus 100 is closest, or within which of the ranges of the following four orientations the orientation of the display apparatus 100 falls).

A normal orientation (an orientation 1): an orientation in which an upper portion of the display surface of the display apparatus 100 is directed upward in the direction of gravity.

An upside-right vertical orientation (an orientation 2): an orientation in which the upper portion of the display surface of the display apparatus 100 is directed to the right as viewed from the user facing the display apparatus 100 while standing upright. An orientation in which the display apparatus 100 is rotated by 90 degrees to the right (clockwise) about an axis perpendicular to the display surface, relative to the normal orientation.

An inverted orientation (an orientation 3): an orientation in which the upper portion of the display surface of the display apparatus 100 is directed downward in the direction of gravity. An orientation in which the display apparatus 100 is rotated by 180 degrees about the axis perpendicular to the display surface, relative to the normal orientation. An orientation upside down relative to the normal orientation.

An upside-left vertical orientation (an orientation 4): an orientation in which the upper portion of the display surface of the display apparatus 100 is directed to the left as viewed from the user facing the display apparatus 100 while standing upright. An orientation in which the display apparatus 100 is rotated by 270 degrees to the right or clockwise (by 90 degrees to the left or counterclockwise) about the axis perpendicular to the display surface, relative to the normal orientation.

In the columns of a row 1101, examples of display according to detected orientations in the states of the above orientations 1 to 4 in a case where the reference orientation is the normal orientation (the orientation 1) are illustrated. If the reference orientation is the normal orientation (the orientation 1), as an assumed use scene, a situation is assumed where the user views the display unit 108 in the state of standing upright (in a position in which an upper portion of the face is directed upward in the direction of gravity, and a lower portion (the chin) of the face is directed downward in the direction of gravity). As illustrated in the row 1101, even if the display apparatus 100 is in any one of the above four orientations, the display direction is automatically rotated according to the orientation of the display apparatus 100 in such a manner that a display object (a content) is displayed in a direction in which the display object (the content) is directed upward in the direction of gravity, thereby making the display object (the content) easily viewable by the user standing upright.

In the columns of a row 1102, examples of display according to detected orientations in the states of the above orientations 1 to 4 in a case where the reference orientation is the upside-right vertical orientation (the orientation 2) are illustrated. If the reference orientation is the upside-right vertical orientation (the orientation 2), as an assumed use scene, a situation is assumed where the user views the display unit 108 in the lying down position in which the right eye of the user is on the lower side in the direction of gravity. As illustrated in the row 1102, the display direction is automatically rotated according to the orientation of the display apparatus 100. That is, even if the display apparatus 100 is in any one of the above four orientations, a display object (a content) is displayed in a direction in which the right side of the display object (the content) is directed downward in the direction of gravity, thereby making the display object (the content) easily viewable by the user in the lying down position in which the right eye is on the lower side in the direction of gravity.

In the columns of a row 1103, examples of display according to detected orientations in the states of the above orientations 1 to 4 in a case where the reference orientation is the inverted orientation (the orientation 3) are illustrated. As illustrated in the row 1103, the display direction is automatically rotated according to the orientation of the display apparatus 100. More specifically, even if the display apparatus 100 is in any one of the above four orientations, a display object (a content) is displayed in a direction in which the upper side of the display object (the content) is directed downward in the direction of gravity (upside down). However, a use scene where such display is suitable is not assumed. Thus, in the present exemplary embodiment, the reference orientation is not set to the inverted orientation (the orientation 3) (display as in the examples of display in the row 1103 is not performed). However, it goes without saying that this does not apply to a case where there is a use scene where it is possible to assume that display in the example of display of the row 1103 is suitable. In this case, display as in the examples of display in the row 1103 may be performed.

In the columns of a row 1104, examples of display according to detected orientations in the states of the above orientations 1 to 4 in a case where the reference orientation is the upside-left vertical orientation (the orientation 4) are illustrated. If the reference orientation is the upside-left vertical orientation (the orientation 4), as an assumed use scene, a situation is assumed where the user views the display unit 108 in the lying down position in which the left eye of the user is on the lower side in the direction of gravity. As illustrated in the row 1104, the display direction is automatically rotated according to the orientation of the display apparatus 100. More specifically, even if the display apparatus 100 is in any one of the above four orientations, a display object (a content) is displayed in a direction in which the left side of the display object (the content) is directed downward in the direction of gravity, thereby making the display object (the content) easily viewable by the user in the lying down position in which the left eye is on the lower side in the direction of gravity.

Figure 10:
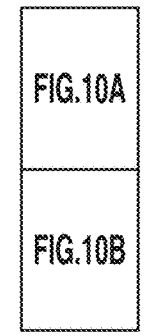
FIG. 10 (10A and 10B) is a flowchart illustrating display control according to a fourth exemplary embodiment.
Figure 10A:
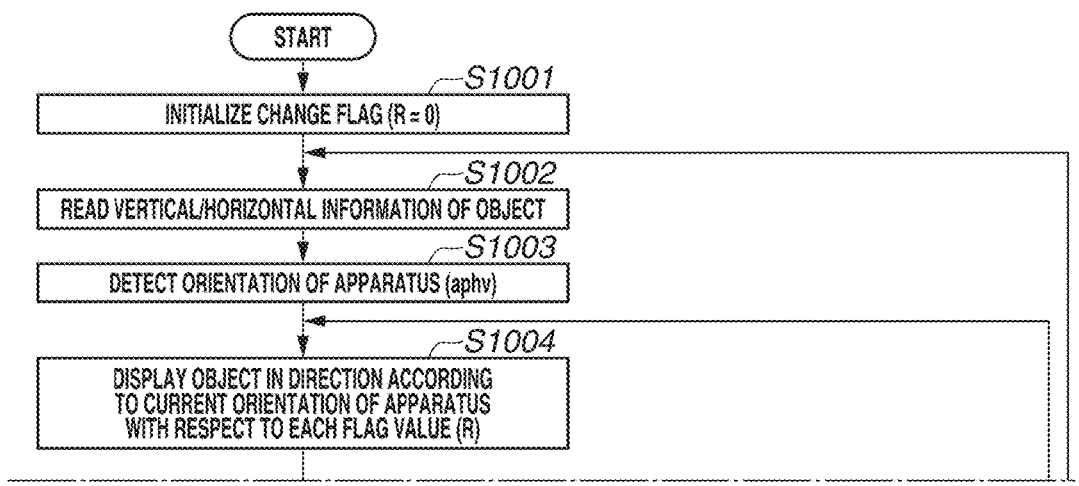
Figure 10B:
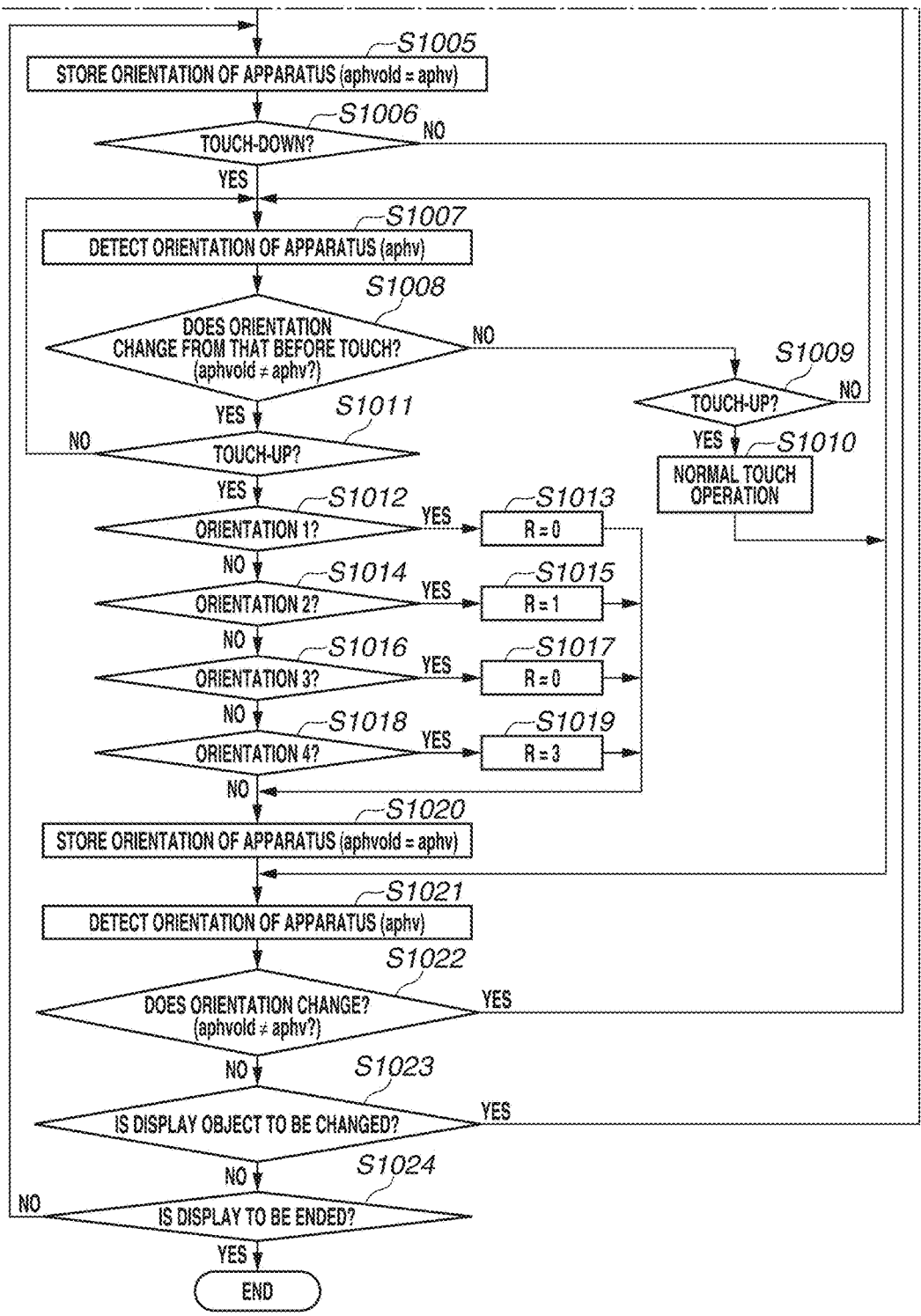

FIG. 10 (10A and 10B) illustrates a flowchart for achieving automatic rotation display as in the examples of display in FIGS. 11A, 11B, and 11C. The flowchart in FIG. 10 (10A and 10B) is achieved by the control unit 101 loading a program recorded in the recording medium 107 into the memory 106 and executing the program.

In step S1001, the control unit 101 initializes the change flag R held in the memory 106 to 0. Consequently, when a display process is started (when software for executing this process is started, or when the display apparatus 100 is turned on), the reference orientation is initialized to the normal orientation (the orientation 1).

In step S1002, the control unit 101 reads vertical/horizontal information of a display object (an image or a document) to be displayed. This process is similar to the process of step S302. If the display object is to be displayed without reflecting the vertical/horizontal information of the display object, this process may be omitted. Further, if the display object is a display object of a type to which vertical/horizontal information is not assigned, such as a web page, this process may be omitted.

In step S1003, based on the outputs of the sensor 103, the control unit 101 detects the orientation of the display apparatus 100. The control unit 101 holds information indicating which of the above orientations 1 to 4 the orientation of the display apparatus 100 is, as the value of the variable aphv indicating the current orientation in the memory 106.

In step S1004, according to the value of the change flag R, the control unit 101 displays on the display unit 108 the display object in a direction according to the current orientation aphv. Since the variable R=0 in the initial state, the control unit 101 displays the display object in a direction (at the rotation angle of the display object) according to the current orientation aphv among the four examples of display illustrated in the row 1101 in FIGS. 11A, 11B, and 11C. In other words, if the current orientation aphv is the orientation 1, the control unit 101 displays the display object without rotating the display object. If the current orientation aphv is the orientation 2, the control unit 101 rotates the display object by 270 degrees clockwise and displays the rotated display object. If the current orientation aphv is the orientation 3, the control unit 101 rotates the display object by 180 degrees and displays the display object upside down. If the current orientation aphv is the orientation 4, the control unit 101 rotates the display object by 90 degrees clockwise and displays the rotated display object.

In step S1005, the control unit 101 stores the value of the current orientation aphv as the variable aphvold, which is held in the memory 106 and indicates the orientation of the display apparatus 100 in at least one cycle before (immediately before). In other words, the control unit 101 saves the current orientation aphv as the orientation in the past in the memory 106.

In step S1006, the control unit 101 determines whether a touch-down is performed. If it is determined that a touch-down is performed (YES in step S1006), the processing proceeds to step S1007. If not (NO in step S1006), the processing proceeds to step S1021.

In step S1007, based on the outputs of the sensor 103, the control unit 101 detects the orientation of the display apparatus 100. This process is similar to the process of step S1003. Further, step S1007 is the process of detecting the orientation of the display apparatus 100 during the touch.

In step S1008, the control unit 101 determines whether the current orientation aphv during the touch changes from the past orientation aphvold indicating the orientation of the display apparatus 100 before the touch-down. In other words, the control unit 101 determines whether, after the touch is started, the orientation of the display apparatus 100 changes while the touch continues. If the orientation of the display apparatus 100 changes (YES in step S1008), the processing proceeds to step S1011. If not (NO in step S1008), the processing proceeds to step S1009.

In step S1009, the control unit 101 determines whether a touch-up is performed. If a touch-up is performed (YES in step S1009), the processing proceeds to step S1010. In step S1010, the control unit 101 performs processing according to the touch-up. This process is similar to the process of step S705. If a touch-up is not performed (NO in step S1009), the processing proceeds to step S1007, and the process of step S1007 is repeated.

In step S1011, the control unit 101 determines whether a touch-up is performed. If a touch-up is performed (YES in step S1011), the processing proceeds to step S1012. If not (NO in step S1011), the processing proceeds to step S1007, and the process of step S1007 is repeated.

In steps S1012, S1014, S1016, and S1018, the control unit 101 determines which of the above orientations 1 to 4 the current orientation aphv indicating the orientation detected immediately before the touch-up is detected in step S1011 is. The processes of steps S1012, S1014, S1016, and S1018 may be performed after the orientation of the display apparatus 100 is detected again immediately after the touch-up is detected in step S1011. In either case, this process is the process of determining the orientation when a touch-up is performed (the orientation when the orientation changes while the user keeps touching the touch panel 109, and the touch is canceled after the change in the orientation).

If it is determined that the current orientation aphv is the orientation 1 (YES in step S1012), then in step S1013, the control unit 101 stores the change flag R=0.

If it is determined that the current orientation aphv is the orientation 2 (YES in step S1014), then in step S1015, the control unit 101 stores the change flag R=1.

If it is determined that the current orientation aphv is the orientation 3 (YES in step S1016), then in step S1017, the control unit 101 stores the change flag R=0. This is because it is unlikely to assume the situation where the user deliberately inverts the display apparatus 100 and views the display apparatus 100 while the user themselves is also in an inverted direction. Even if the display apparatus 100 is inverted, the display apparatus 100 assumes that the user is not viewing the display apparatus 100 while the user themselves is also in an inverted direction. Then, the display apparatus 100 sets R=0 similarly to the case of the normal orientation. That is, display is not performed in a case where R=2 illustrated in FIGS. 11A, 11B, and 11C. In other words, in a case where R=1 or 3, the user rotates the display apparatus 100 to be inverted while keeping touching the touch panel 109 and separates the touch, and thereby can reset the reference orientation R to 0. It goes without saying that in the case of the orientation 3, the display apparatus 100 may set R=2, instead of R=0.

If it is determined that the current orientation aphv is the orientation 4 (YES in step S1018), then in step S1019, the control unit 101 stores the change flag R=3.

In step S1020, the control unit 101 stores the orientation having led to the processes of steps S1012 to S1019, as the variable aphvold indicating the orientation in the past.

In step S1021, based on the outputs of the sensor 103, the control unit 101 detects the orientation of the display apparatus 100 again. This process is similar to the process of step S1003.

In step S1022, the control unit 101 compares the past orientation aphvold with the current orientation aphv, thereby determining whether the orientation of the display apparatus 100 changes (whether the orientation changes in the state in which the touch panel 109 is not touched). If the orientation does not change (NO in step S1022), the processing proceeds to step S1023. If the orientation changes (YES in step S1022), the processing proceeds to step S1004. In step S1004, the display apparatus 100 changes (rotates) the direction of the display object displayed on the display unit 108 to a direction that matches the value of the change flag R and the current orientation aphv. In other words, even if the user rotates the display apparatus 100 while keeping touching the touch panel 109, thereby changing the reference orientation (the variable R), the display direction of the display object is not fixed. The display object is rotated and displayed according to a change in the orientation of the display apparatus 100 and the reference orientation after that. Each value of the variable R and the display direction with respect to each orientation are as illustrated in FIGS. 11A, 11B, and 11C. Consequently, for example, in the state in which R=1, and even if the display apparatus 100 is rotated in any direction, the user viewing the display apparatus 100 in the state of lying down as illustrated in the assumed use scene in the row 1102 in FIGS. 11A, 11B, and 11C can view the display object in a direction in which the display object is easily viewable by the user, while keeping lying down. Also if the user is lying down in the opposite direction, the change flag is set to R=3, and the reference orientation is set to an orientation different from that in the row 1101. Consequently, the display object is displayed as illustrated in the row 1104 according to the orientation of the display apparatus 100. Thus, the user can view the display object in a direction in which the display object is easily viewable by the user, while keeping lying down in the opposite direction.

In step S1023, the control unit 101 determines whether a change instruction to change (a switch instruction to switch) the display object (display target) to be displayed on the display unit 108 is given (the control unit 101 receives a switch instruction). For example, in a case where a captured image is viewed, the change instruction is a change instruction given by an operation for image advancement for switching the image to be displayed on the display unit 108 to another image. Alternatively, the change instruction is an automatic switch instruction according to the lapse of a certain time by a slide show process. Yet alternatively, in a case where a web page is viewed, the change instruction is an instruction to display another page or display a page displayed in another window. If a change instruction to change the display object is not given (NO in step S1023), the processing proceeds to step S1024. If a change instruction to change the display object is given (YES in step S1023), the processing proceeds to step S1002. If the processing proceeds to step S1002, the control unit 101 reads vertical/horizontal information regarding the display object after the switching. Then, through steps S1003 and S1004, the control unit 101 displays on the display unit 108 the display object after the switching in a direction that matches the current value of the change flag R and the current orientation aphv of the display apparatus 100. Consequently, for example, in the state in which R=1, and even if the display object is switched, the user viewing the display apparatus 100 in the state of lying down can view the display object after the switching in a direction in which the display object is easily viewable by the user, while keeping lying down.

In step S1024, the control unit 101 determines whether an instruction to end the display process in FIG. 10 (10A and 10B) is given. Examples of the instruction to end the display process in FIG. 10 (10A and 10B) include the turning off of the display apparatus 100, the shutdown (end) of the software for executing the display process, auto display off (the process of automatically ending the display of the display unit 108 and turning off the display unit 108 if a no-operation state continues for a predetermined time), and auto power off (the process of automatically turning off the display apparatus 100 if a no-operation state continues for a predetermined time). Consequently, after the change flag R is changed so that the user can easily view the display object in the state of lying down, and if the user stands up to change to a position different from the state of lying down, the display of the display unit 108 is only once ended and then resumed, whereby it is possible to reset the change flag R. In other words, it is possible to reset the change flag R without confusion by restarting the situation where the display apparatus 100, or restarting the software for performing the display process.

If an instruction to end the display process in FIG. 10 (10A and 10B) is not given in step S1024 (NO in step S1024), the processing returns to step S1005, and the process of step S1005 is repeated, thereby continuing the display based on the change flag R. If an instruction to end the display process in FIG. 10 (10A and 10B) is given in step S1024 (YES in step S1024), the processing ends. If the image display process is resumed after that, the change flag R is reset, and display control is performed such that the reference orientation is the normal orientation.

FIGS. 12A to 12F illustrate examples of display in a case where the above display process is performed.

Figure 12C:
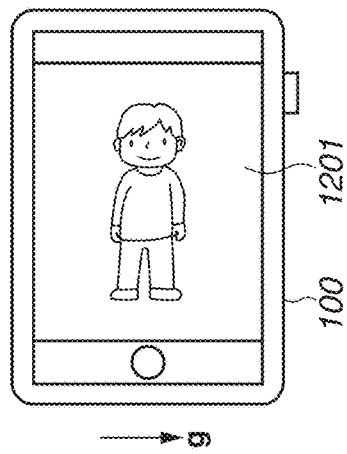
FIGS. 12A to 12F are diagrams illustrating examples of display of display objects.
Figure 12F:
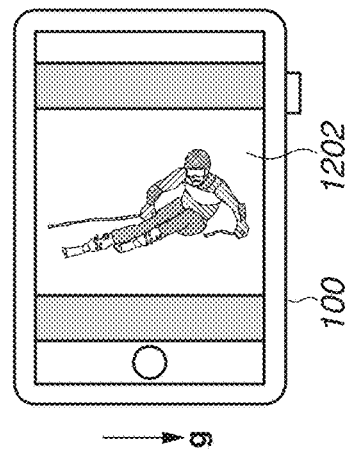
Figure 12B:
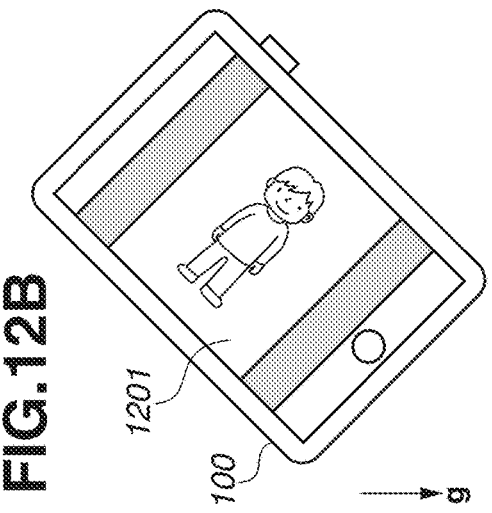
Figure 12E:
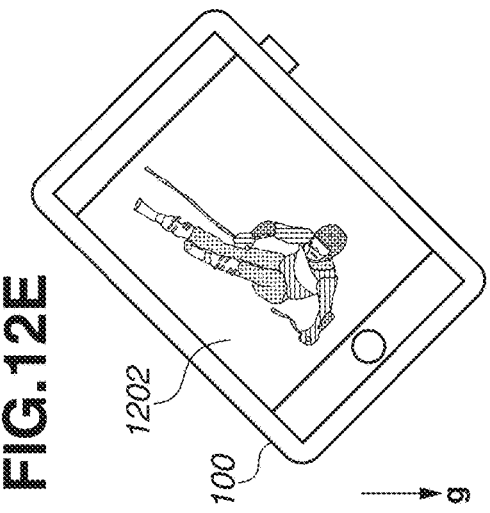
Figure 12A:
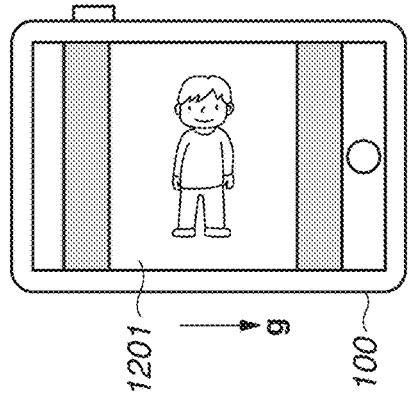

FIG. 12A illustrates an example of display of an image 1201 in a case where the reference orientation is the orientation 2 (R=1), and the display apparatus 100 is in the orientation 1. This example of display is similar to that in the first column of the row 1102 in FIGS. 11A, 11B, and 11C (an image rotation angle of 90 degrees). Since the reference orientation is the orientation 2 (R=1), and the display apparatus 100 is in the orientation 1, the image 1201 is displayed in a direction rotated by 90 degrees clockwise relative to the display unit 108 as a result of the process of step S1004.

FIG. 12C illustrates an example of display in a case where the orientation of the display apparatus 100 is changed from the state in FIG. 12A to the state in FIG. 12B to the orientation 2. This example of display is similar to that in the second column of the row 1102 in FIGS. 11A, 11B, and 11C (an image rotation angle of 0 degree). Since the reference orientation is the orientation 2 (R=1), and the display apparatus 100 is in the orientation 2, the image 1201 is displayed in a direction that is not rotated relative to the display unit 108 as a result of the process of step S1004. In other words, in FIG. 12C, the image 1201 is displayed in a display direction rotated by 90 degrees counterclockwise from the display direction in FIG. 12A.

Figure 12D:
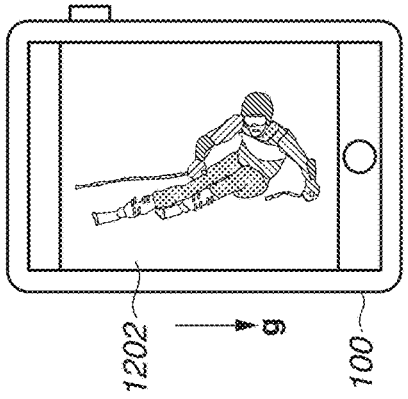

FIG. 12D illustrates an example of display of an image 1202 in a case where the reference orientation is the orientation 2 (R=1), and the display apparatus 100 is in the orientation 1. Since the reference orientation is the orientation 2 (R=1), and the display apparatus 100 is in the orientation 1, the image 1202 is displayed in a direction rotated by 90 degrees clockwise relative to the display unit 108 as a result of the process of step S1004. If a change instruction to change the display object is given in the display state in FIG. 12A, the determination is Yes in step S1024. Then, in step S1004, the image 1202 is displayed in a direction rotated by 90 degrees clockwise relative to the display unit 108. In other words, both the image 1201 in FIG. 12A before the switching of the display object and the image 1202 in FIG. 12B after the switching of the display object are similarly displayed in a direction rotated by 90 degrees clockwise.

FIG. 12F illustrates an example of display in a case where the orientation of the display apparatus 100 is changed from the state in FIG. 12D to the state in FIG. 12E to the orientation 2. Since the reference orientation is the orientation 2 (R=1), and the display apparatus 100 is in the orientation 2, the image 1202 is displayed in a direction that is not rotated relative to the display unit 108 as a result of the process of step S1004. That is, in FIG. 12F, the image 1202 is displayed in a display direction rotated by degrees counterclockwise from the display direction in FIG. 12D. Further, also if a change instruction to change the display object to the image 1202 is given in the display state in FIG. 12C, the image 1202 is displayed in the display state in FIG. 12F. That is, if a change instruction to change the display object is given, the determination is Yes in step S1024. Then, in step S1004, the image 1202 is displayed in a direction that is not rotated relative to the display unit 108. That is, both the image 1201 in FIG. 12C before the switching of the display object and the image 1202 in FIG. 12F after the switching of the display object are similarly displayed in a direction that is not rotated relative to the display unit 108.

According to the above display process, as illustrated in the first column of the row 1101 in FIGS. 11A, 11B, and 11C, if the reference orientation is the normal orientation, and the display apparatus 100 is in the orientation 1, the image is displayed without rotating the image relative to the display unit 108. If the fact that in the display state illustrated in the first column of the row 1101 in FIGS. 11A, 11B, and 11C, the display apparatus 100 changes to the orientation 2 without the touch panel 109 being touched (subjected to a specific operation) is detected, the image is automatically rotated in a direction rotated by 270 degrees (by 90 degrees counterclockwise) as in the second column of the row 1101 in FIGS. 11A, 11B, and 11C and displayed.

On the other hand, even if the fact that in the display state illustrated in the first column of the row 1101 in FIGS. 11A, 11B, and 11C, the display apparatus 100 changes from the orientation 1 to the orientation 2 by involving the operation of rotating the display apparatus 100 while keeping touching the touch panel 109 is detected, then as illustrated in the second column of the row 1102 in FIGS. 11A, 11B, and 11C, the display direction of the image is not changed from 0 degree. At this time, the reference orientation R is changed from 0 to 1. If the fact that in the state illustrated in the second column of the row 1102 in FIGS. 11A, 11B, and 11C, the display apparatus 100 changes from the orientation 2 to the orientation 1 without the touch panel 109 being touched is detected, then as illustrated in the first column of the row 1102 in FIGS. 11A, 11B, and 11C, the image is automatically rotated in a direction rotated by 90 degrees clockwise and displayed. The display direction of the image in the first column of the row 1102 in FIGS. 11A, 11B, and 11C is a direction different by 180 degrees from the display direction of the image illustrated in the second column of the row 1101 in FIGS. 11A, 11B, and 11C.

In the processing in FIG. 10 (10A and 10B), an example has been described where the change flag R is reset when the display process is started. The present invention, however, is not limited to this. Alternatively, the operation of resetting the reference orientation may be received from the user without restarting the display process, and the reference orientation may be reset (R=0, i.e., the reference orientation may be set to the normal orientation). For example, if a triple tap on the touch panel 109 (the operation of repeating a touch-down and a touch-up three times in a predetermined time) or a gesture operation for drawing a predetermined locus such as a circle on the touch panel 109 is received, the reference orientation may be reset. Alternatively, a reset icon (a display item) for receiving the resetting of the reference orientation may be displayed. Then, if a touch operation on the reset icon is performed, the reference orientation may be reset. Yet alternatively, if the operation of strongly shaking the display apparatus 100 twice or more (the operation of shaking the display apparatus 100 multiple times) or the operation of switching the vertical or horizontal direction of the display apparatus 100 twice or more in a row in a short time (the operation of switching the vertical or horizontal direction of the display apparatus 100 multiple times in a row in a short time) is performed, the reference orientation may be reset. For example, if the acceleration sensor included in the sensor 103 detects, twice in a row in a predetermined time, a pair of accelerations including an acceleration in a positive direction and an acceleration in a negative direction of which the absolute values are each equal to or greater than a predetermined value, the control unit 101 determines that the operation of strongly shaking the display apparatus 100 twice is performed. Further, for example, if the sensor 103 detects in a predetermined time a change in which the orientation of the display apparatus 100 changes from the vertical orientation to the horizontal orientation (a first change in the vertical or horizontal direction) and a change in which the orientation of the display apparatus 100 changes from the horizontal orientation to the vertical orientation (a second change in the vertical or horizontal direction), the control unit 101 determines that the operation of switching the vertical or horizontal direction of the display apparatus 100 twice in a row in a short time is performed.

Further in the above examples, an example has been described where a specific operation for changing the orientation of the display apparatus 100 in the state of performing a touch-on on the touch panel 109 is performed, thereby changing the setting of the reference orientation (changing the change flag R). The present invention, however, is not limited to this. Alternatively, a setting item, displayed on a setting menu screen, for switching the reference orientation may be operated, thereby changing the reference orientation. Yet alternatively, an icon, displayed in a drawer displayed by performing a touch move operation from a peripheral portion to a center portion of the touch panel 109, for switching the reference orientation may be tapped, thereby switching the reference orientation. Yet alternatively, if a change in the vertical or horizontal direction of the display apparatus 100 is detected, a display object such as an image may be rotated and displayed, and simultaneously, an icon for switching the reference orientation may be caused to appear and displayed for a predetermined time. Then, if a tap operation on the icon is performed in the predetermined time, the reference orientation may be switched.

While suitable exemplary embodiments of the present invention have been described, the present invention is not limited to these specific exemplary embodiments. The present invention also includes various forms without departing from the spirit and scope of the invention. Further, the above exemplary embodiments merely illustrate exemplary embodiments of the present invention, and can also be appropriately combined with each other.

In the above exemplary embodiments, a case has been described where the upward or downward direction of the display apparatus 100 and the vertical or horizontal orientation of the display apparatus 100 are detected by the control unit 101 via a single sensor 103. The present invention, however, is not limited to this case. Alternatively, the upward or downward direction and the vertical or horizontal orientation may be detected via different sensors.

In the above exemplary embodiments, a case has been described where the upward or downward direction is detected via a sensor for outputting continuous values. In the Z-axis direction, however, it is only necessary to be able to determine a threshold zth, and a member (a unit) for determining binary values may be used.

In the above exemplary embodiments, a case has been described where the power switch 102 and the operation switch 105 are placed at predetermined positions. The present invention, however, is not limited to this case. That is, the power switch 102 and the operation switch 105 may be placed at any positions in the display apparatus 100. For example, the power switch 102 and the operation switch 105 may be switches that are displayed on the display unit 108 and operated via the touch panel 109.

In the above exemplary embodiments, a case has been described where the display apparatus 100 is applied to a mobile phone terminal. The present invention, however, is not limited to this case. Alternatively, the display apparatus 100 can be applied to any device for controlling the display of the display unit 108. In other words, the present invention can be applied to an imaging apparatus such as a digital camera, a tablet terminal, a personal digital assistant (PDA), a mobile image viewer, a digital photo frame, a music player, a game apparatus, and an electronic book reader that are capable of controlling the display of the display unit 108.

In the above exemplary embodiments, the case of a still image has been described. Alternatively, a moving image can also be similarly processed.

In the above exemplary embodiments, if detecting a touch-down or a touch-on via the touch panel 109, the control unit 101 may display, on the display unit 108, guide display indicating that it is possible to maintain the display direction of the image relative to the display apparatus 100 by rotating the control unit 101 while keeping touching the touch panel 109. A single piece of hardware may control the control unit 101, or a plurality of pieces of hardware may share processing to control the entire apparatus.

According to the present invention, it is possible to display a display object in a display direction desired by a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-179844, filed Sep. 14, 2016, and No. 2015-197896, filed Oct. 5, 2015, which are hereby incorporated by reference herein in their entirety.

What is claimed is:

1. A display control apparatus comprising:
   a display unit; and
   one or more processors which, when executing instructions, causes the display control apparatus to:
   detect an orientation of the display control apparatus;
   determine a touch state of the display unit;
   set any one of a plurality of states including at least a first state and a second state; and
   perform control in such a manner that a direction in which a display object is displayed on the display unit is changed according to the detected orientation and the set state;
   in a case where the first state is set by the display control apparatus,
   the display object is displayed in a first direction in a case where the display control apparatus is in a first orientation,
   the display object is displayed in a second direction, which is different from the first direction by 270 degrees, in a case where the display control apparatus is in a second orientation, which is different from the first orientation by 90 degrees, and
   the display object is displayed in a third direction, which is different from the first direction by 90 degrees, in a case where the display control apparatus is in a third orientation, which is different from the first orientation by 270 degrees; and
   in a case where the second state is set by the display control apparatus, the display object is displayed in the third direction in the case where the display control apparatus is in the first orientation, the display object is displayed in the first direction in the case where the display control apparatus is in the second orientation, and the display object is displayed in a fourth direction, which is different from the first direction by 180 degrees, in the case where the display control apparatus is in the third orientation, wherein a change in the display direction of the first display object is based on a combination of a change in orientation of the display control apparatus and the touch state of the display unit.

2. The display control apparatus according to claim 1, wherein the display control apparatus performs control in such a manner that:

in the case where the first state is set by the display control apparatus, the display object is displayed in the fourth direction in a case where the display control apparatus is in a fourth orientation, which is different from the first orientation by 180 degrees; and in the case where the second state is set by the display control apparatus, the display object is displayed in the second direction in the case where the display control apparatus is in the fourth orientation.

3. The display control apparatus according to claim 1, wherein the display control apparatus performs control in such a manner that, in a case where a third state is set by the display control apparatus, the display object is displayed in the second direction in the case where the display control apparatus is in the first orientation, the display object is displayed in the fourth direction in the case where the display control apparatus is in the second orientation, and the display object is displayed in the first direction in the case where the display control apparatus is in the third orientation.

4. The display control apparatus according to claim 3, wherein the display control apparatus performs control in such a manner that, in the case where the third state is set by the display control apparatus, the display object is displayed in the third direction in a case where the display control apparatus is in a fourth orientation.

5. The display control apparatus according to claim 3, wherein the display control apparatus sets a state corresponding to a reference orientation for determining the direction in which the display object is displayed on the display unit, wherein the first state corresponds to a state in which the reference orientation is the first orientation, wherein the second state corresponds to a state in which the reference orientation is the second orientation, and wherein the third state corresponds to a state in which the reference orientation is the third orientation, which is different from the second orientation by 180 degrees.

6. The display control apparatus according to claim 1, wherein the display control apparatus performs control in such a manner that, in a case where a fourth state is set by the display control apparatus, the display object is displayed in the fourth direction in the case where the display control apparatus is in the first orientation, the display object is displayed in the third direction in the case where the display control apparatus is in the second orientation, and the display object is displayed in the second direction in the case where the display control apparatus is in the third orientation.

7. The display control apparatus according to claim 1, wherein, in a case where the orientation of the display control apparatus changes while involving a specific operation, the display control apparatus changes setting of states, and in a case where the orientation of the display control apparatus changes without involving the specific operation, the display control apparatus does not change the setting of the states.

8. The display control apparatus according to claim 7, wherein the specific operation is a touch operation on the display unit, and wherein, in a case where the orientation of the display control apparatus changes in a state in which a touch on the display unit is detected, the display control apparatus changes the setting of the states.

9. The display control apparatus according to claim 8, wherein, in the case where the orientation of the display control apparatus changes in the state in which a touch on the display unit is detected, the display control apparatus sets a state based on an orientation of the display control apparatus when the touch is canceled.

10. The display control apparatus according to claim 9, wherein, in a case where an orientation of the display control apparatus when the touch is canceled after the orientation of the display control apparatus changes is the first orientation, the display control apparatus sets the first state, wherein, in a case where the orientation of the display control apparatus when the touch is canceled after the orientation of the display control apparatus changes is the second orientation, the display control apparatus sets the second state, and wherein, in a case where the orientation of the display control apparatus when the touch is canceled after the orientation of the display control apparatus changes is the third orientation, the display control apparatus sets a third state.

11. The display control apparatus according to claim 10, wherein, in a case where the orientation of the display control apparatus when the touch is canceled after the orientation of the display control apparatus changes is a fourth orientation, the display control apparatus sets the first state.

12. The display control apparatus according to claim 1, wherein, when the display control apparatus is started, the display control apparatus resets the setting of the states to the first state.

13. The display control apparatus according to claim 1, wherein, when software for displaying the display object is started, the display control apparatus resets the setting of the states to the first state.

14. The display control apparatus according to claim 1, wherein, when display is resumed on the display unit after the display unit is turned off in response to a fact that no operation is performed for a predetermined period of time, the display control apparatus resets the setting of the states to the first state.

15. The display control apparatus according to claim 1, wherein the display control apparatus resets the setting of the states to the first state in response to a touch operation on a specific display item.

16. The display control apparatus according to claim 1, wherein the display control apparatus resets the setting of the states to the first state in response to at least any one of an operation of shaking the display control apparatus for a plurality of times, an operation of switching a vertical or horizontal orientation of the display control apparatus for a plurality of times in a row in a short period of time, an operation of repeating an operation of touching the display unit and separating the touch for three times in a predetermined period of time, and a gesture operation of drawing a predetermined locus on the display unit.

17. The display control apparatus according to claim 1, wherein the one or more processors which, when executing the instructions, further causes the display control apparatus to receive a switch instruction to switch the display object to be displayed on the display unit,
   wherein, even in a case where the display object is switched from a first display object to a second display object according to the switch instruction, the display control apparatus holds the setting of the states, and
   wherein the display control apparatus performs control in such a manner that a direction in which the second display object is displayed on the display unit is changed according to an orientation of the display control apparatus detected by the display control apparatus and a state set by the display control apparatus.

18. A display control apparatus comprising:
   a display unit; and
   one or more processors which, when executing instructions, causes the display control apparatus to:
   detect an orientation of the display control apparatus;
   determine a touch state of the display unit; and
   perform control in such a manner that a direction of a display object displayed on the display unit is changed according to the orientation detected by the display control apparatus,
   wherein the display control apparatus performs control in such a manner that,
   in a case where the display control apparatus is in a first orientation,
   when a fact that the orientation of the display control apparatus changes to a second orientation, which is different from the first orientation in a vertical or horizontal direction of the display unit, without a specific operation being performed in a state in which the display object is displayed on the display unit in a first direction with respect to the display unit is detected, the display direction of the display object is changed to a second direction, which is different from the first direction by 90 degrees, and the display object is displayed in the second direction, and
   even when a fact that the orientation of the display control apparatus changes from the first orientation to the second orientation after the specific operation is performed in a state in which the display object is displayed in the first direction on the display unit is detected, the display direction of the display object is not changed from the first direction, and thereafter, when a fact that the orientation of the display control apparatus changes from the second orientation to the first orientation is detected, the display direction of the display object is changed to a third direction, which is different from the first direction by 90 degrees and different from the second direction by 180 degrees, and the display object is displayed in the third direction,
   wherein a change in the display direction of the first display object is based on a combination of a change in orientation of the display control apparatus and the touch state of the display unit.

19. A control method for controlling a display control apparatus including a display unit, the control method comprising:
   detecting an orientation of the display control apparatus;
   determining a touch state of the display unit;
   setting any one of a plurality of states including at least a first state and a second state; and
   performing control in such a manner that a direction in which a display object is displayed on the display unit is changed according to the detected orientation and the set state,
   wherein, in the performing control, control is performed in such a manner that:
   in a case where the first state is set by the setting,
   the display object is displayed in a first direction in a case where the display control apparatus is in a first orientation,
   the display object is displayed in a second direction, which is different from the first direction by 270 degrees, in a case where the display control apparatus is in a second orientation, which is different from the first orientation by 90 degrees, and
   the display object is displayed in a third direction, which is different from the first direction by 90 degrees, in a case where the display control apparatus is in a third orientation, which is different from the first orientation by 270 degrees; and
   in a case where the second state is set in the setting,
   the display object is displayed in the third direction in the case where the display control apparatus is in the first orientation,
   the display object is displayed in the first direction in the case where the display control apparatus is in the second orientation, and
   the display object is displayed in a fourth direction, which is different from the first direction by 180 degrees, in the case where the display control apparatus is in the third orientation,
   wherein a change in the display direction of the first display object is based on a combination of a change in orientation of the display control apparatus and the touch state of the display unit.

20. A control method for controlling a display control apparatus including a display unit, the control method comprising:
   detecting an orientation of the display control apparatus; and
   performing control in such a manner that a direction of a display object displayed on the display unit is changed according to the detected orientation,
   wherein, in the performing control, control is performed in such a manner that,
   in a case where the display control apparatus is in a first orientation,
   when a fact that the orientation of the display control apparatus changes to a second orientation, which is different from the first orientation in a vertical or horizontal direction of the display unit, without a specific operation being performed in a state in which the display object is displayed on the display unit in a first direction with respect to the display unit is detected, the display direction of the display object is changed to a second direction, which is different from the first direction by 90 degrees, and the display object is displayed in the second direction, and even when a fact that the orientation of the display control apparatus changes from the first orientation to the second orientation after the specific operation is performed in a state in which the display object is displayed in the first direction on the display unit is detected, the display direction of the display object is not changed from the first direction, and thereafter, when a fact that the orientation of the display control apparatus changes from the second orientation to the first orientation is detected, the display direction of the display object is changed to a third direction, which is different from the first direction by 90 degrees and different from the second direction by 180 degrees, and the display object is displayed in the third direction, wherein a change in the display direction of the first display object is based on a combination of a change in orientation of the display control apparatus and the touch state of the display unit.

21. A non-transitory computer readable storage medium storing a program for causing a computer to execute a control method for controlling a display control apparatus including a display unit, the control method comprising:

detecting an orientation of the display control apparatus;
determining a touch state of the display unit;
setting any one of a plurality of states including at least a first state and a second state; and
performing control in such a manner that a direction in which a display object is displayed on the display unit is changed according to the orientation detected by the display control apparatus and the set state;
in a case where the first state is set by the setting,
the display object is displayed in a first direction in a case where the display control apparatus is in a first orientation,
the display object is displayed in a second direction, which is different from the first direction by 270 degrees, in a case where the display control apparatus is in a second orientation, which is different from the first orientation by 90 degrees, and
the display object is displayed in a third direction, which is different from the first direction by 90 degrees, in a case where the display control apparatus is in a third orientation, which is different from the first orientation by 270 degrees; and
in a case where the second state is set by the setting,
the display object is displayed in the third direction in the case where the display control apparatus is in the first orientation,
the display object is displayed in the first direction in the case where the display control apparatus is in the second orientation, and
the display object is displayed in a fourth direction, which is different from the first direction by 180 degrees, in the case where the display control apparatus is in the third orientation, wherein a change in the display direction of the first display object is based on a combination of a change in orientation of the display control apparatus and the touch state of the display unit.

22. A non-transitory computer readable storage medium storing a program for causing a computer to execute a control method for controlling a display control apparatus including a display unit, the control method comprising:

detecting an orientation of the display control apparatus;
determining a touch state of the display unit; and
performing control in such a manner that a direction of a display object displayed on the display unit is changed according to the orientation detected by the display control apparatus,
wherein, in the performing control, control is performed in such a manner that:
in a case where the display control apparatus is in a first orientation,
when a fact that the orientation of the display control apparatus changes to a second orientation, which is different from the first orientation in a vertical or horizontal direction of the display unit, without a specific operation being performed in a state in which the display object is displayed on the display unit in a first direction with respect to the display unit is detected, the display direction of the display object is changed to a second direction, which is different from the first direction by 90 degrees, and the display object is displayed in the second direction, and
even when a fact that the orientation of the display control apparatus changes from the first orientation to the second orientation after the specific operation is performed in a state in which the display object is displayed in the first direction on the display unit is detected, the display direction of the display object is not changed from the first direction, and thereafter, when a fact that the orientation of the display control apparatus changes from the second orientation to the first orientation is detected, the display direction of the display object is changed to a third direction, which is different from the first direction by 90 degrees and different from the second direction by 180 degrees, and the display object is displayed in the third direction, wherein a change in the display direction of the first display object is based on a combination of a change in orientation of the display control apparatus and the touch state of the display unit.

* * * * *